US012372202B2

(12) United States Patent
Pisoni et al.

(10) Patent No.: US 12,372,202 B2
(45) Date of Patent: Jul. 29, 2025

(54) LUBRICANT DISTRIBUTION SYSTEM WITH OVERFILL PROTECTION

(71) Applicant: Lincoln Industrial Corporation, St. Louis, MO (US)

(72) Inventors: William Joseph Pisoni, St. Louis, MO (US); Christopher D. Holland, Wood River, IL (US)

(73) Assignee: Lincoln Industrial Corporation, St. Louis, MO (US)

( * ) Notice: Subject to any disclaimer, the term of this patent is extended or adjusted under 35 U.S.C. 154(b) by 0 days.

(21) Appl. No.: 18/470,970

(22) Filed: Sep. 20, 2023

(65) Prior Publication Data

US 2025/0092991 A1    Mar. 20, 2025

(51) Int. Cl.
*F16N 19/00* (2006.01)
*F16K 21/18* (2006.01)
*F16N 23/00* (2006.01)

(52) U.S. Cl.
CPC ............ *F16N 19/003* (2013.01); *F16K 21/18* (2013.01); *F16N 23/00* (2013.01)

(58) Field of Classification Search
CPC .......... F16K 31/18; F16K 1/301; F16K 21/18; F16K 11/07; F16K 11/0712;
(Continued)

(56) References Cited

U.S. PATENT DOCUMENTS 1,821,314 A * 9/1931 Moore .................... F16N 27/00
                                                    184/42
1,850,063 A * 3/1932 Pepper .................... B67D 7/42
                                                    251/48

(Continued)

FOREIGN PATENT DOCUMENTS

WO    WO-2008059479 A2 *  5/2008  ............. F16K 1/301
WO        2015021260 A1     2/2015

OTHER PUBLICATIONS

"Dyna-Star® HP and HF Pump Auto-Fill® Shut Off Kit," Instructions, 332518F, Graco Information, Graco Inc., Minneapolis, MN, Aug. 2021, 14pgs.

(Continued)

*Primary Examiner* — Anna M Momper
*Assistant Examiner* — Katelynne R Burrell
(74) *Attorney, Agent, or Firm* — Stinson LLP

(57) ABSTRACT

A lubricant distribution system for supplying lubricant. The system includes a reservoir for lubricant and a pump assembly for pumping the lubricant. The pump assembly includes a crank case having a crank assembly that is insertable into and removable from a housing of the crank case without disassembly of the crank assembly, to provide ease of assembly and disassembly of the crank case. The system also includes a shut-off valve stopping the refilling of the reservoir with lubricant. The shut-off valve includes a blocker for preventing the flow of lubricant to the reservoir and an actuation surface for positioning the blocker to prevent the flow of lubricant. For overfill protection, the actuation surface is movable relative to the blocker. The system also includes a mount with a one-way valve mounted thereto. The one-way valve is removable from the mount for easy replacement or cleaning of the one-way valve.

39 Claims, 25 Drawing Sheets

(58) Field of Classification Search
CPC .... F16K 11/0716; F16K 3/314; F16N 19/003;
F16N 23/00; F16N 7/02; F16N 5/00;
F16N 13/04; F16N 13/10; F16N 27/00;
F16N 19/006; B65D 90/26; B67D 7/367
See application file for complete search history.

(56) References Cited

U.S. PATENT DOCUMENTS

| | | | |
|---|---|---|---|
| 2,187,684 | A | 1/1940 | Fox et al. |
| 2,636,441 | A | 4/1953 | Woelfer |
| 2,787,225 | A | 4/1957 | Rotter |
| 3,469,532 | A | 9/1969 | Wegmann et al. |
| 3,502,029 | A | 3/1970 | Halladay |
| 3,945,772 | A | 3/1976 | Van de Moortele |
| 4,064,907 | A * | 12/1977 | Billington ................. F17C 5/02 137/446 |
| 4,196,750 | A * | 4/1980 | Peters ..................... F16K 17/02 137/625.66 |
| 4,266,582 | A * | 5/1981 | Sergent ................... B67D 7/365 251/38 |
| 4,360,038 | A * | 11/1982 | Trinkwalder, Jr. ...... F16K 37/00 141/DIG. 1 |
| 4,487,340 | A | 12/1984 | Shaffer |
| 4,762,474 | A | 8/1988 | Dartnall |
| 5,235,999 | A * | 8/1993 | Lindquist ............... B67D 7/365 137/433 |
| 5,472,012 | A * | 12/1995 | Wood ...................... F16K 31/26 137/430 |
| 5,813,432 | A * | 9/1998 | Elsdon ................... B67D 7/367 137/413 |
| 6,050,081 | A * | 4/2000 | Jansen ..................... F16K 11/07 137/112 |
| 6,102,676 | A | 8/2000 | DiCarlo et al. |
| 6,244,387 | B1 * | 6/2001 | Paluncic ................. F16N 25/02 184/32 |
| 6,318,421 | B1 * | 11/2001 | Lagache ................. B67D 7/367 137/430 |
| 6,872,161 | B2 | 3/2005 | DiCarlo |
| 8,448,750 | B2 * | 5/2013 | Gaugush ................. G01F 23/74 73/309 |
| 9,140,246 | B2 | 9/2015 | Conley et al. |
| 9,239,044 | B2 | 1/2016 | Conley et al. |
| 10,527,228 | B2 | 1/2020 | Holman et al. |
| 10,781,971 | B2 | 9/2020 | Holman et al. |
| 10,962,130 | B2 * | 3/2021 | Mandera ................. F16N 13/02 |
| 2004/0262552 | A1 * | 12/2004 | Lowe ...................... E03C 1/052 251/11 |
| 2013/0256062 | A1 | 10/2013 | Kotyk et al. |
| 2018/0100620 | A1 * | 4/2018 | Holman .................. F16K 31/22 |
| 2018/0142796 | A1 * | 5/2018 | Holman .................. F16K 31/18 |
| 2018/0224011 | A1 * | 8/2018 | Mandera ................. F16N 13/10 |

OTHER PUBLICATIONS

"Dyna-Star® 200:1 and 120:1 Grease Pumps," Instructions, 3A7519C, Graco Information, Graco Inc., Minneapolis, MN, Jan. 2023, 28pgs.
"Dyna-Star® HP Pump System," Instructions, 3A3956D, Graco Information, Graco Inc., Minneapolis, MN, Oct. 2019, 26pgs.
"10:1 Dyna-Star® Pump Module with Auto-Fill Shutoff," Instructions, 3A3429D, Graco Information, Graco Inc., Minneapolis, MN, Aug. 2022, 28pgs.
"Dyna-Star® HP Pump System," Instructions, Repair and Parts, 332540J, Graco Information, Graco Inc., Minneapolis, MN, Jul. 2022, 16pgs.
"Dyna-Star® Hydraulic Reciprocator and Pump," Instructions, Repair and Parts, 312350L, Graco Information, Graco Inc., Minneapolis, MN, Oct. 2015, 28pgs.
"10:1 Dyna-Star® Pump Module," Instructions, Repair and Parts, 312349G, Graco Information, Graco Inc., Minneapolis, MN, Oct. 2010, 22pgs.
"5:1 Dynastarr Pump Module," Instructions—Parts List, 309098G, Graco Inc., Minneapolis, MN, Jan. 2017, 16pgs.
"50:1 Fire-Ball® 300 Pump Module," Instructions—Parts List, 308955F, Graco Inc., Minneapolis, MN, Sep. 2007, 16pgs.
"Compact Dyna-Star® Electric Pump," Instructions, 3A6941L, Graco Information, Graco Inc., Minneapolis, MN, Apr. 2022, 54pgs.
"Single-line automatic lubrication systems," Product catalogue 2023, SKF, 200pgs.
"FlowMaster reservoir level sensor and overflow prevention system," Lincoln/SKF, 2012, 4pgs.
"Mechanical overflow prevention system," Lincoln/SKF, 2020, 4pgs.
"FlowMaster II hydraulic pump and reservoir assembly," User and maintenance instructions, Model 85879, series "A", SKF, Jun. 2023, 13pgs.
"FlowMaster II rotary driven hydraulic pump," User and maintenance instructions, Models 85705 and 85705MSO, series "B" CAT branded, SKF, Jan. 2021, 12pgs.
"FlowMaster II rotary driven hydraulic pump," User and maintenance instructions, Model 85722-AU, 85764 and 85764-AU, series "A", SKF, Jul. 2023, 20pgs.
"FlowMaster II rotary driven hydraulic pump series "A"," User and maintenance instructions, Models 85731, 5 U.S. gallons, 85732, 60 lbs (27 kg), 85733, 120 lbs (54 kg), 85734, 400 lbs (181 kg), 85138, 400 lbs (181 kg), 85144 (CAT branded), SKF, Feb. 2023, 28pgs.
"FlowMaster II rotary driven hydraulic pump, series "A"," Operation, assembly, disassembly and troubleshooting glide, Lincoln/SKF, Jan. 2014, 24pgs.
"FlowMaster II pump," User and maintenance instructions, Model 85875, SKF, Mar. 2016, 12pgs.

* cited by examiner

LUBRICANT DISTRIBUTION SYSTEM WITH OVERFILL PROTECTION

FIELD

The present disclosure relates to lubricant distribution systems, and more particularly to overfill protection for a lubricant reservoir.

BACKGROUND

Lubricant distribution systems supply lubricant (e.g., grease) to one or more points of lubrication. Typically, lubricant distribution systems include a pump, such as those shown in the following U.S. Pat. Nos. 2,187,684; 2,636,441; 2,787,225; 3,469,532; 3,502,029; 3,945,772; 4,487,340; 4,762,474; and 6,102,676, that operates to pump lubricant from a reservoir. In one type of lubrication system, called a single line injector lubrication system, the lubricant distribution system pumps lubricant through a single supply line (can have one or more single supply lines) to one or more injectors which dispense measured quantities of lubricant to the points of lubrication.

SUMMARY

In one aspect, a lubricant distribution system comprises a reservoir configured to contain lubricant. The reservoir includes a follower configured to move up and down in the reservoir in response to a changing level of lubricant in the reservoir. An inlet is arranged to deliver lubricant to the reservoir. A shut-off valve is in fluid communication with the inlet. The shut-off valve includes a blocker selectively positionable for permitting flow of lubricant through the inlet and for preventing flow of lubricant through the inlet. The shut-off valve includes a valve actuator having a follower engagement surface arranged to be engaged by the follower when lubricant in the reservoir fills to a predetermined level to position the blocker to prevent flow of lubricant through the inlet. The follower engagement surface is movable relative to the blocker.

In another aspect, a shut-off valve for lubricant comprises a valve housing having an inlet, an outlet, and passaging fluidly connecting the inlet and the outlet. A blocker is selectively positionable relative to the valve housing for permitting flow of lubricant through the passaging from the inlet to the outlet and for preventing flow of lubricant through the passaging from the inlet to the outlet. A valve actuator is operatively connected to the blocker for selectively positioning the blocker relative to the valve housing. The valve actuator has an actuation surface configured to be moved to move the blocker into a position in which the blocker prevents flow of lubricant through the passaging. The actuation surface is movable relative to the blocker.

Other objects and features will be in part apparent and in part pointed out hereinafter.

BRIEF DESCRIPTION OF THE DRAWINGS

Corresponding reference characters indicate corresponding parts throughout the drawings.

DETAILED DESCRIPTION

Figure 1:
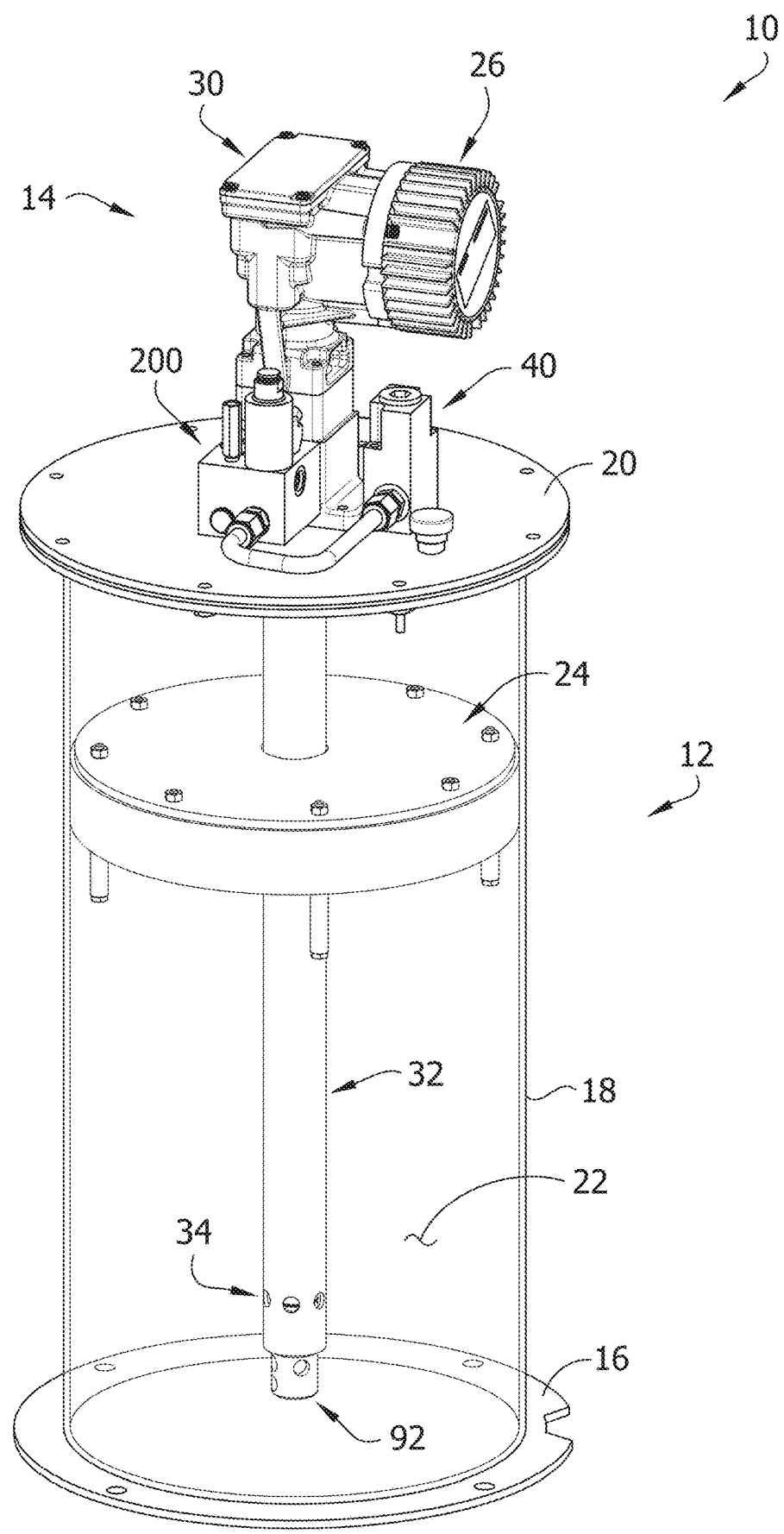
FIG. 1 is a perspective of a lubricant distribution system according to one embodiment of the present disclosure, with a wall of a reservoir shown transparent to show interior details.
Figure 2:
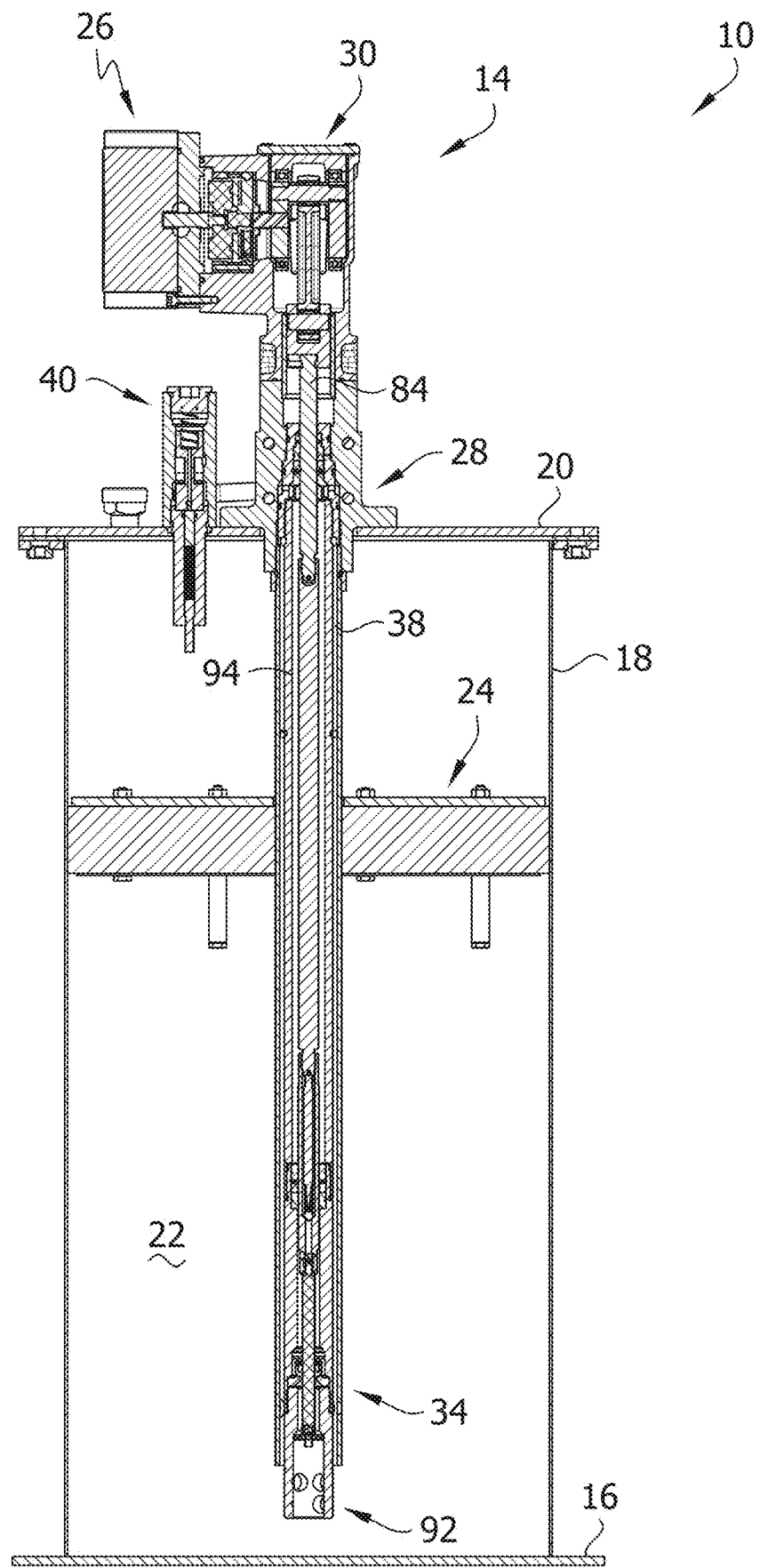
FIG. 2 is cross-section of the lubricant distribution system.

Referring to the FIGS. 1 and 2, one embodiment of a lubricant distribution system according to the present disclosure is generally indicated by reference numeral 10. The lubricant distribution system 10 of the present disclosure is suitable for supplying or sending lubricant, such as grease, to one or more points of lubrication (not shown). These points of lubrication may be part of a piece of machinery (not shown), such as factory equipment or large construction vehicles, or any other device needed lubrication. The lubricant distribution system 10 may be part of an overall lubrication system, such as a single line injector lubrication system, that includes the lubricant distribution system of the present disclosure, one or more injectors (broadly, lubricant metering devices) that dispense the lubricant to the points of lubrication, and one or more single supply lines carrying the lubricant from the lubricant distribution system to the one or more injectors. While described in relation to a single line injector lubrication system, it is understood the aspects of the present disclosure may be implemented in other types of lubrication systems and in other contexts besides lubrication. Further, while described in the context of supplying lubricant, the system 10 of the present disclosure can also be used to supply other types of fluids, such as inks, friction modifiers, and mastics/adhesives. The use of the term "lubricant" herein is intended to cover such other types of fluids.

The lubricant distribution system 10 includes a reservoir or drum 12 and a pump assembly 14 supported by the reservoir. The reservoir 12 is configured to contain lubricant to be dispensed by the lubricant distribution system 10. The reservoir 12 includes a base or bottom plate, a cylindrical side wall 18, and a lid or top plate 20 defining an interior 22 which holds the lubricant. The pump assembly 14 is mounted to the lid 20, such as with one or more fasteners. The reservoir 12 includes a follower 24, as is generally known in the art. The follower 24 is configured to move up and down in the reservoir in response to a changing level of lubricant in the reservoir 12. The follower 24 bears against the lubricant contained in the reservoir 12 and moves up and down with the level of the lubricant in the reservoir. The follower 24 may pressurize the lubricant in the reservoir and may also wipe lubricant from the inside surface of the side wall 18 as the lubricant level falls (as lubricant is pumped out of the reservoir by the pump assembly 14). The follower 24 may slidingly and sealingly engage the side wall 18 and the pump assembly 14. In one embodiment, the follower 24 may comprise a foam insert mounted to a metal plate. It is understood that other configurations and constructions of the follower are within the scope of the present disclosure. A vent valve (not shown) may be provided on the lid 20 of the reservoir 12 for relieving pressure in the interior 22 as the follower 24 moves up and down in the reservoir.

The pump assembly 14 includes a motor 26, a pump 28, and a drive train 30 operatively connecting the motor to the pump. The pump 28 is configured to pump lubricant from the reservoir 12. In the illustrated embodiment, the pump 28 is a lance pump. Examples of lance pumps are shown and described in U.S. Pat. Nos. 9,239,044 and 6,102,676, the entireties of which are hereby incorporated by reference. The pump 28 includes a lance structure 32 that extends down into the interior 22 of the reservoir 12, toward the base 16, through a hole in the lid 20. It is understood that the use of other types of pumps, besides lance pumps, are within the scope of the present disclosure.

The lubricant distribution system 10 includes a reservoir supply or refill inlet 34 arranged to deliver lubricant to the reservoir 12 to refill the reservoir with lubricant after the lubricant is depleted. When the amount of lubricant in the reservoir 12 is depleted, the reservoir must be refilled with lubricant. The reservoir 12 is refilled by a lubricant supply (not shown). Often, the lubricant supply is located some distance from the reservoir 12. For example, the reservoir 12 may be located in a building and the lubricant supply may be located in a truck outside the building. The interior 22 of the reservoir 12 is filled with lubricant pumped to the reservoir refill inlet 34 from the lubricant supply. The reservoir refill inlet 34 is provided near the base 16 of the reservoir 12, below the follower 24. In the illustrated embodiment, the reservoir refill inlet 34 is defined by (e.g., part of) the pump 28, although other configurations are within the scope of the present disclosure. For example, the reservoir supply inlet can be part of the reservoir 12, such as provided in the side wall 18, or the reservoir supply inlet can be provided by a separate structure, such as a conduit extending down from the lid 20 and through the follower 24, or can be part of the follower. In the illustrated embodiment, the pump 28 includes a pump refill inlet 36 (FIG. 11) and pump refill passaging 38 (see generally FIG. 2) providing fluid communication between the pump refill inlet and the reservoir supply inlet 34. The pump refill passaging 38 extends along the lance structure 32 of the pump 28 to the reservoir refill inlet 34. Lubricant is moved by the lubricant supply through the pump refill inlet 36, through the pump refill passaging 38, and out of the reservoir supply inlet 34. In this manner, the reservoir supply inlet 34 may also be considered a pump refill outlet. In the illustrated embodiment, the reservoir refill inlet 34 comprises one or more openings and/or an open lower end of the pump refill passaging 38. Other configurations of the reservoir refill inlet 34 are within the scope of the present disclosure.

Figure 3:
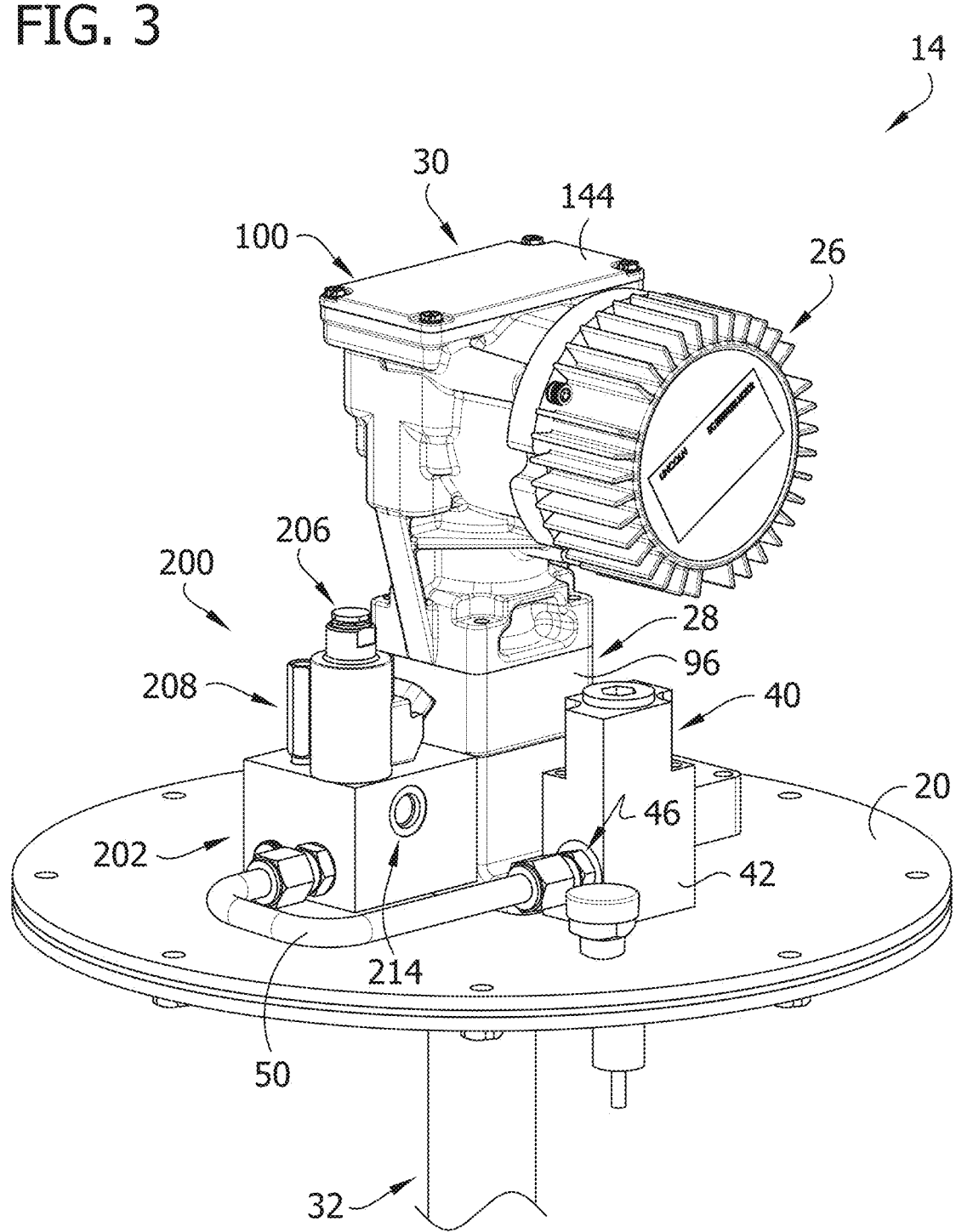
FIG. 3 is an enlarged fragmentary front perspective of the lubricant distribution system.
Figure 4:
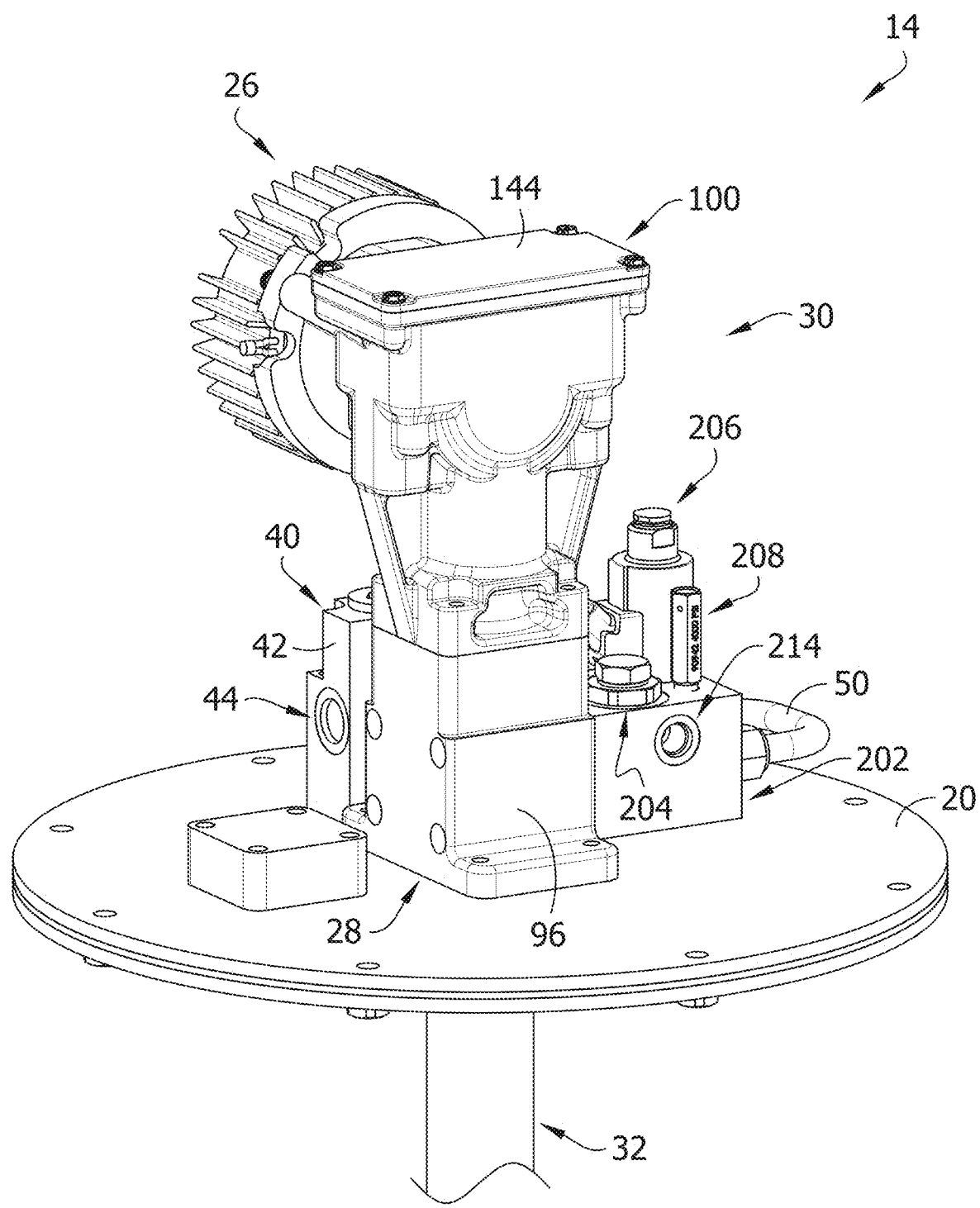
FIG. 4 is an enlarged fragmentary rear perspective of the lubricant distribution system.

The lubricant is pumped out of the reservoir 12 by the pump 28. When the lubricant contained in the reservoir 12 is depleted, the reservoir is refilled by the lubricant supply pumping lubricant to the reservoir refill inlet 34. Referring to FIGS. 3 and 4, the lubricant distribution system 10 includes a shut-off valve 40 for the lubricant. The shut-off valve 40 is configured to stop the flow of lubricant into the interior 22 of the reservoir 12 from the lubricant supply when the reservoir is sufficiently filled with lubricant—i.e., the lubricant reaches the predetermined fill level. The shut-off valve 40 is mounted to the lid 20 of the reservoir 12. The shut-off valve 40 is in fluid communication with the reservoir refill inlet 34. The shut-off valve 40 is disposed fluidly between the lubricant supply and the reservoir refill inlet 34 for selectively permitting and preventing the flow of lubricant from the lubricant supply to the reservoir refill inlet 34.

Referring to FIGS. 5A-D, the shut-off valve 40 includes a valve housing 42. The valve housing 42 may comprise one or more pieces coupled together. The valve housing 42 includes a shut-off valve inlet 44, a shut-off valve outlet 46, and shut-off valve passaging 48 fluidly connecting the shut-off valve inlet and the shut-off valve outlet. The shut-off valve inlet 44 is configured to receive lubricant from the lubricant supply. The shut-off valve inlet 44 can be configured to connect to plumbing (not shown), such as a conduit, hose, fitting, etc., that carries the lubricant from the lubricant supply to the shut-off valve 40. In one embodiment, the shut-off valve inlet 44 is connected to (e.g., fluidly downstream of) a disconnect (e.g., a hydraulic/grease disconnect) (not shown) that can quickly connect and disconnect the lubricant supply to the shut-off valve 40. The disconnect may automatically close when not connected to the lubricant supply and automatically open when connected to the lubricant supply. The shut-off valve outlet 46 is configured to connected to a refill line or conduit 50 (FIGS. 3 and 4), which carries the lubricant from the shut-off valve 40 toward the reservoir refill inlet 34 (via the pump refill inlet 36 and the pump refill passaging 38). The shut-off valve 40 includes a blocker 52 that is selectively positionable relative to the valve housing for permitting the flow of lubricant from the shut-off valve inlet 44 to the shut-off valve outlet 46 and for preventing or blocking the flow of lubricant from the shut-off valve inlet to the shut-off valve outlet. Because the shut-off valve outlet 46 is in fluid communication with the reservoir refill inlet 34, permitting and preventing the flow of lubricant through the shut-off valve 40 permits and prevents, respectively, the flow of lubricant from the reservoir refill inlet 34 into the interior 22 of the reservoir 12. The shut-off valve passaging 48 includes a blocker section 48A and the blocker 52 is movably positioned in the blocker section. In the illustrated embodiment, the blocker 52 comprises a spool. The spool includes a sealing head 54, a guide head 56, and a shaft 58 extending between the sealing and guide heads. The sealing head 54 is configured to engage (specifically, sealingly engage) an interior sealing surface 60 of the valve housing 42 defining a portion of the blocker section 48A. The interior sealing surface 60 and the sealing head 54 are each cylindrical, thereby enabling the spool 58 to slide along the interior sealing surface while maintaining the seal between the spool and the valve housing 42. The guide head 56 also sealingly engages the valve housing 42 and helps guide the movement of the spool in the blocker section 48A of the shut-off valve passaging 48. The spool includes vent passaging 62 extending through the spool, from one side of the spool to the other, thereby fluidly connecting the portions of the valve passaging 48 on either side of the spool to one another without any interruptions or blocks. The vent passaging 62 allows the pressure on either side of the spool in the valve passaging 48 to equalize as the spool moves in the valve passaging. Without the vent passaging 62, pressure could build up on one side of the spool or the other in the valve passaging 48, which could revisit if not prevent movement of the spool in the valve passaging. Other configurations of the blocker are within the scope of the present disclosure. For example, instead of a spool, the blocker may comprise a seat plug that selectively engages a seat for permitting and preventing the flow of lubricant.

Figure 5A:
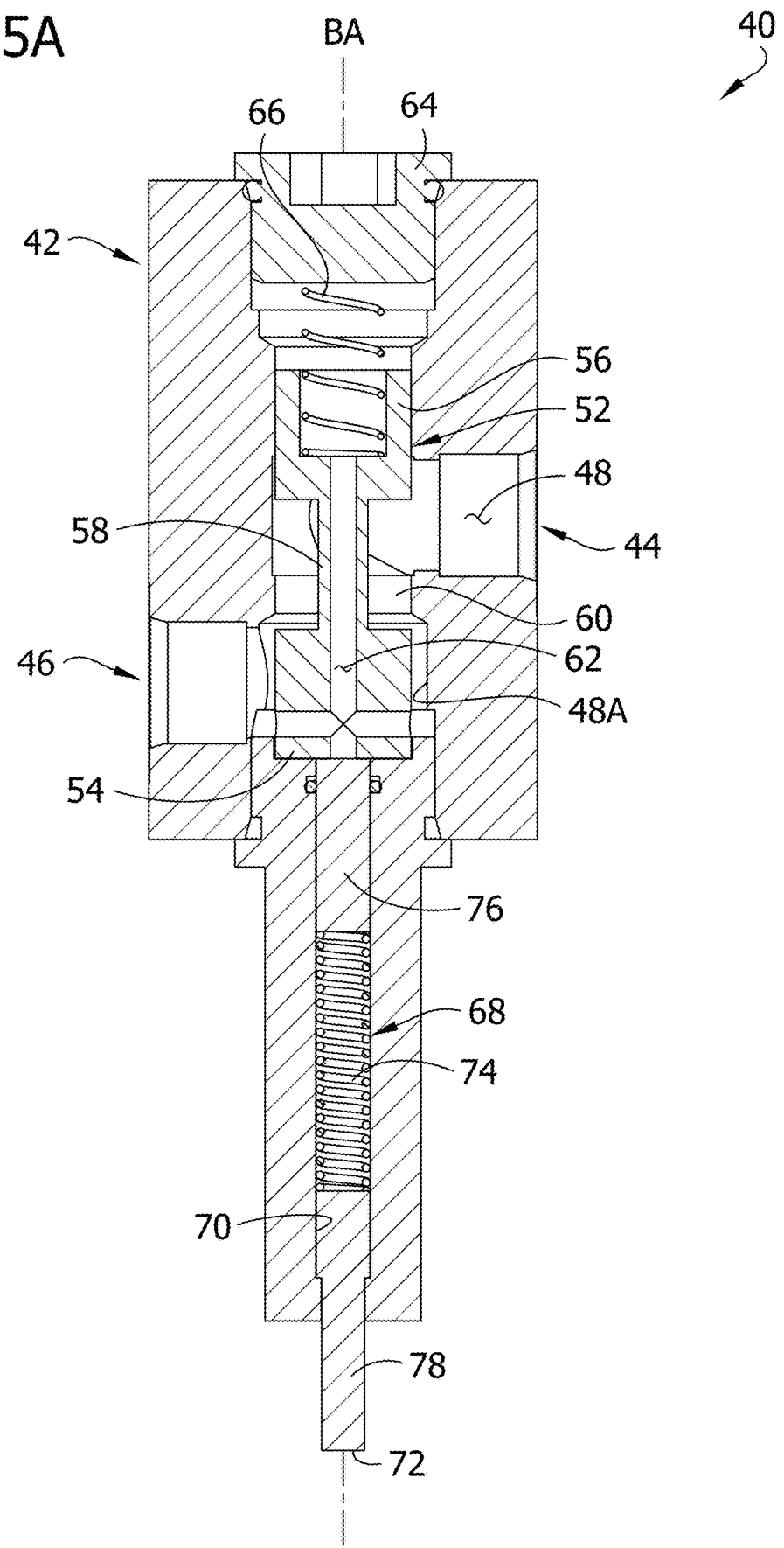
FIG. 5A is a cross-section of a shut-off valve of the lubricant distribution system according to one embodiment of the present disclosure, with the shut-off valve in an open configuration.
Figure 5B:
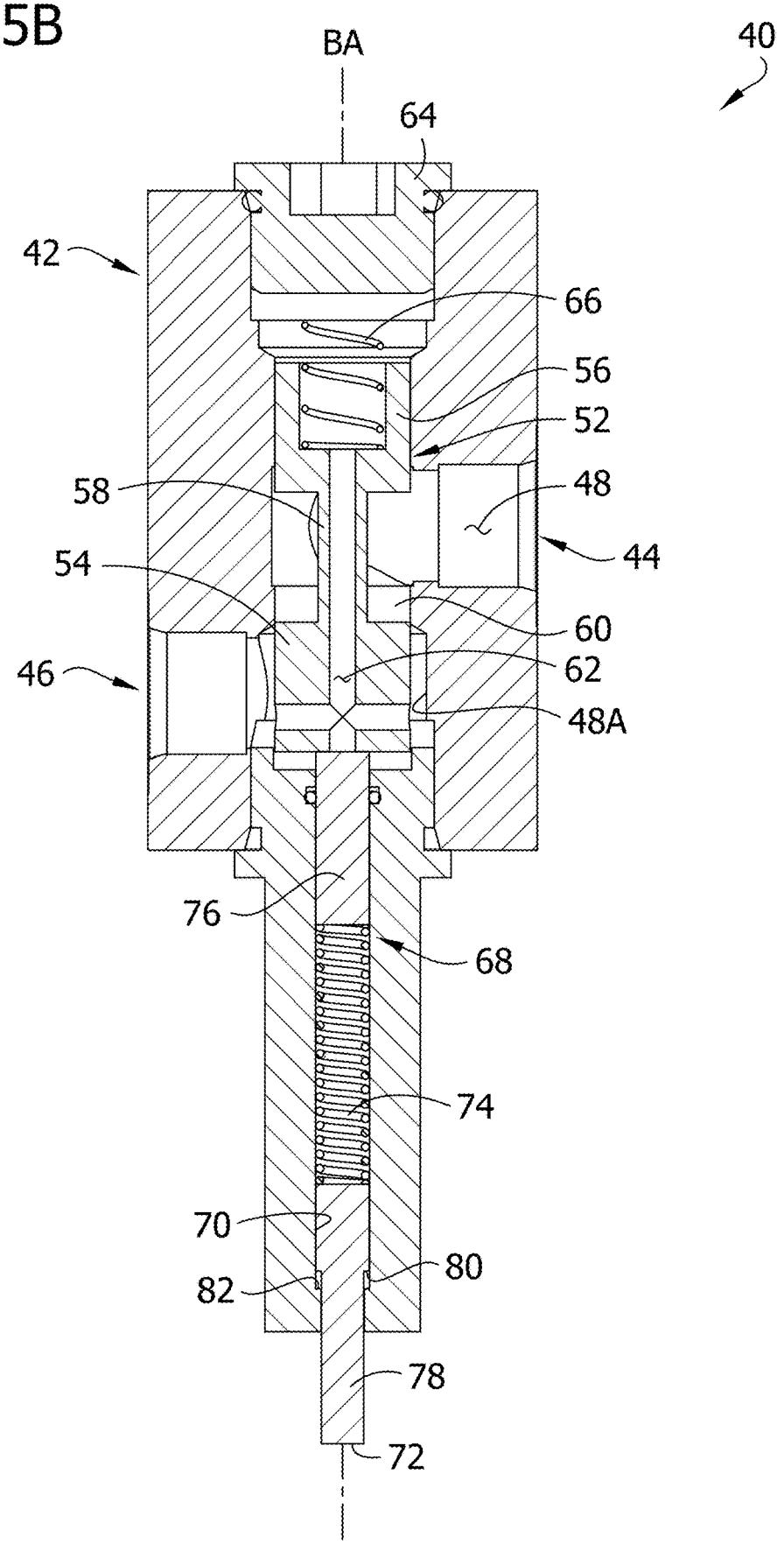
FIG. 5B is a cross-section of the shut-off valve, with the shut-off valve in a closed configuration.
Figure 5C:
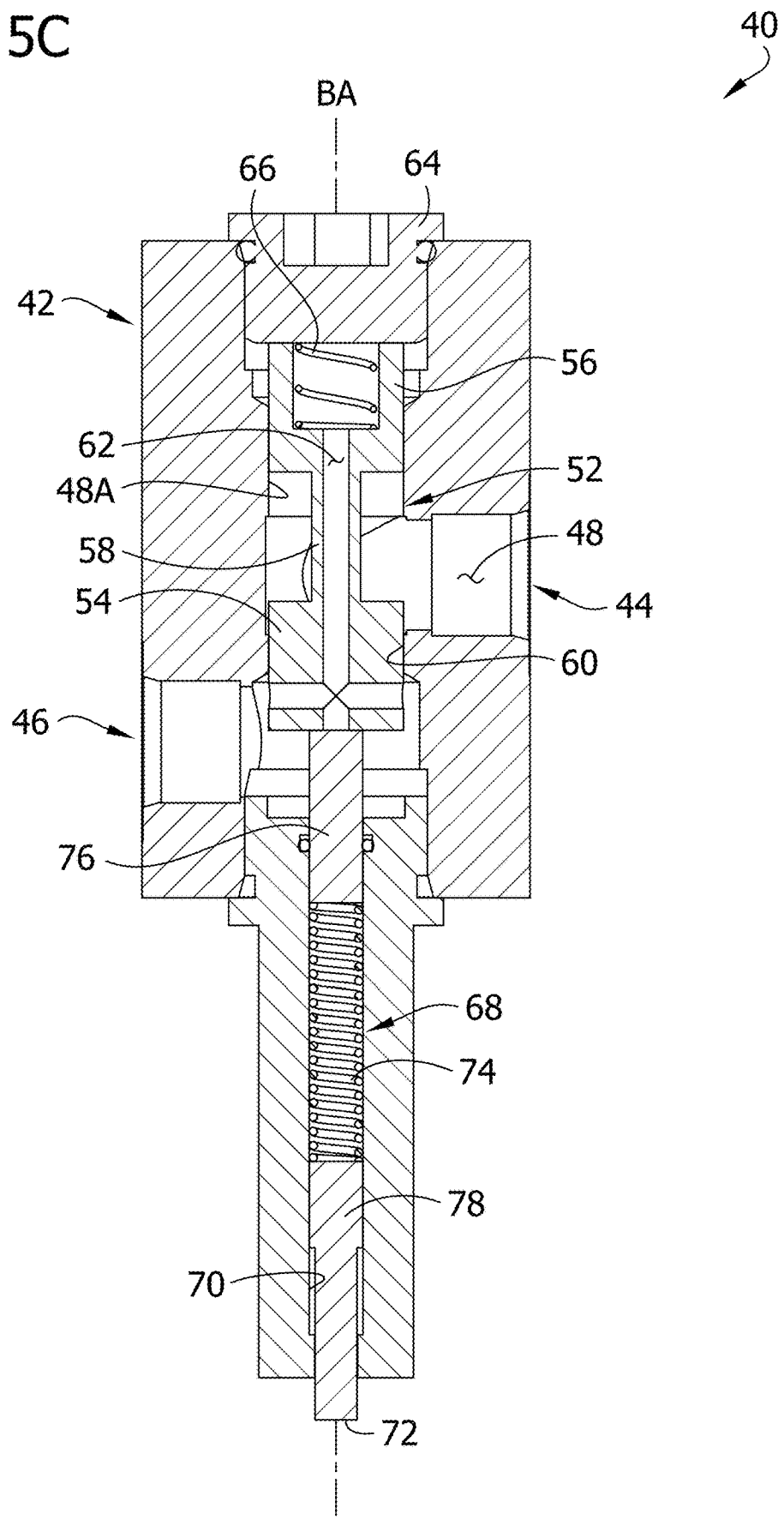
FIG. 5C is a cross-section of the shut-off valve, with the shut-off valve in another closed configuration.
Figure 5D:
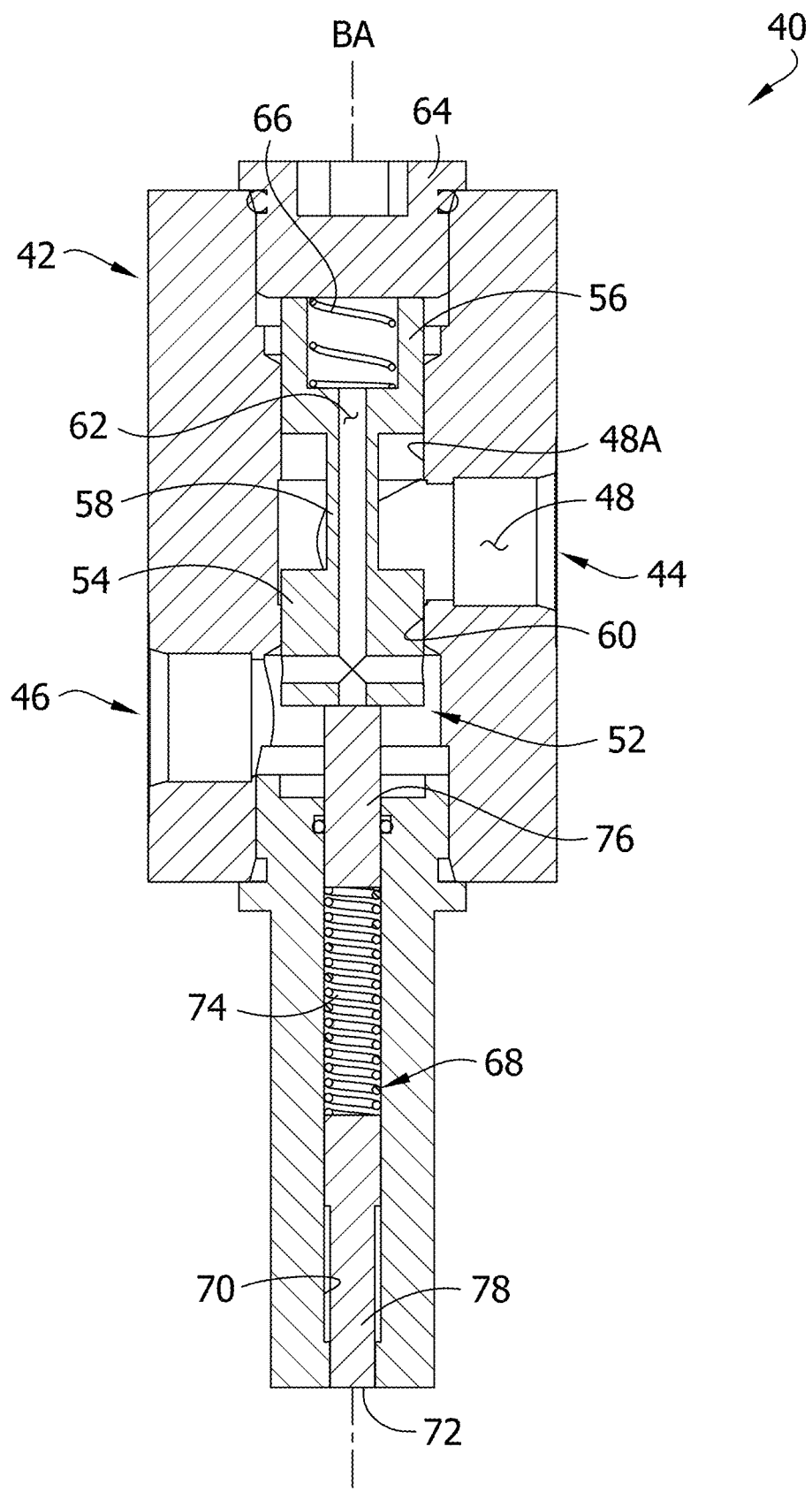
FIG. 5D is a cross-section of the shut-off valve, with the shut-off valve in another closed configuration.

The blocker 52 moves or slides, linearly, along a blocker axis BA to selectively permit and prevent the flow of lubricant. The blocker 52 is moveable, relative to the valve housing 42, between an open position (FIG. 5A) and a plurality of closed positions (FIGS. 5B-D) (broadly, at least one closed position). The blocker 52 moves along a blocker axis BA between the open and closed positions. In the open position, shown in FIG. 5A, the sealing head 54 of the blocker 52 is spaced apart from the interior sealing surface 60, thereby permitting the flow of lubricant between the valve housing 42 and the sealing head. In the open position, the lubricant is free to flow along the shut-off valve passaging 48 from the shut-off valve inlet 44 to the shut-off valve outlet 46. The lubricant flows along the shut-off valve passaging 48, around the shaft 48 (which has a diameter smaller than the diameter of the blocker section 48A), around the sealing head 54, and toward the shut-off valve outlet 46. In the closed positions (FIGS. 5B-D), the sealing head 54 of the blocker 52 engages the interior sealing surface 60, thereby forming a circumferential seal between the sealing head 54 and the valve housing 42 which prevents the flow of lubricant therebetween, thereby preventing the flow of lubricant through the valve passaging 48. FIG. 5B shows the blocker 52 in one closed position and FIGS. 5C-D show the blocker in another closed position. Because the blocker 52 comprises a spool, the blocker may continue to move relative to the valve housing 42 after forming the seal. In other words, different portions of the sealing head 54 may engage the interior sealing surface 60 to form the seal in different closed positions. This allows the blocker 52 to maintain the seal with the valve housing 52, even as the blocker continues to move in a first or closing direction. The closing direction is the direction the blocker moves, along the blocker axis BA, from the open position towards the closed positions. In FIGS. 5A-D, the closing direction is generally upward. The shut-off valve 40 includes a stop 64 arranged to be engaged by the blocker 52 (specifically, the guide head 56) to limit the movement of the blocker in the closing direction. FIGS. 5C-D illustrated the blocker 52 in engagement with the stop 64, thereby showing the furthest closed position in the closing direction of the blocker. For reference, a second or opening direction is opposite the closing direction. The opening direction is the direction the blocker moves, along the blocker axis BA, from the closed positions towards the open position. In FIGS. 5A-D, the opening direction is generally downward.

The shut-off valve 40 includes a blocker or reset spring 66 which biases the blocker 52 toward the opening position. In the illustrated embodiment, the blocker spring 66 comprises a coil spring having one end engaged with the stop 64 and the other end engaged with the guide head 56. As the blocker 52 moves from the open position toward the closed positions, the blocker compresses the blocker spring 66.

The shut-off valve 40 includes a valve actuator 68 operatively connected to the blocker 52 for selectively positioning or moving the blocker relative to the valve housing 42. Specifically, the valve actuator 68 is configured to move the blocker 52 from the open position to the closed positions. The valve actuator 68 is configured to move along the blocker axis BA to position the blocker relative to the valve housing 42. In the illustrated embodiment, the valve actuator 68 comprises a slider disposed in a bore 70 of the valve housing 42. The bore 70 is parallel to or coextensive with the blocker axis BA. The slider is arranged to slide (in the closing direction) in the bore, relative to the valve housing 42, along the blocker axis BA to position or move the blocker in any one of the closed positions. The valve actuator 68 includes an actuation or follower engagement surface 72. The actuation surface 72 is arranged to be engaged and moved by the follower 24 when the lubricant in the reservoir 12 fills to the predetermined level to move the blocker 52 to any one of the closed positions, and thereby prevent the flow of lubricant through the shut-off valve 40. An upper end of the valve actuator 68 is arranged to engage the blocker 52 and to move the blocker from the open position toward the closed positions. The actuation surface 72 is defined by a lower end of the valve actuator 68 and is arranged to be engaged and moved by the follower 24 when the follower moves upward in the reservoir 12 as the reservoir is refilled with the lubricant.

To protect the shut-off valve 40 and other components (e.g., the follower 24) of the lubricant distribution system 10 from any damage that may result from overfilling the reservoir 12 with lubricant, the shut-off valve 40 includes overfill protection measures. Because the follower 24 continues to rise as the reservoir 12 is filled with the lubricant, overfilling the reservoir 12 can results in the follower 24 placing undue stress on the shut-off valve and/or other components of the lubricant distribution system. While described in the context of overfilling, the follower 24 may also rise past the predetermined fill level for other reasons such as thermal expansion, leakage, improper filling, or other means, and the overfill protection measures described herein protect the lubricant distribution system 10 in these situations as well. One overfill protection measure includes the actuation surface 72 being movable relative to the blocker 52. This allows the actuation surface 72 to continue to be moved by the follower 24, such as if the follower continues to move upward due to overfill, even though the blocker 52 is engaged with the stop 64 and, thereby prevented from further movement in the closing direction. This movement of the actuation surface 72 allows the follower 24 to continue to move upward without damaging or placing undue stress on the lubricant distribution system 10. The actuation surface 72 is movable relative to the blocker 52 along the blocker axis BA. The shut-off valve 40 includes an overfill spring 74 arranged to permit the actuation surface 72 to move relative to the blocker 52. The overfill spring 74 is operatively disposed between the actuation surface 72 and the blocker 52, such that force transmitted from the follower's 24 engagement with the actuation surface is transmitted through the overfill spring to the blocker. Thus, the overfill spring 74 is arranged to bias the blocker 52 and the actuation surface 72 away from one another. In the illustrated embodiment, the valve actuator 68 (specifically, the slider) includes the overfill spring 74. The valve actuator 68 (specifically, the slider) includes a first or upper rod or valve stem 76 and a second or lower rod or valve stem 78. The first and second rods 76, 78 are supported by and slidable relative to the valve housing 42, along the blocker axis BA. The first and second rods 76, 78 are also slidable relative to one another along the blocker axis BA. The first rod 76 is arranged to engage and push the blocker 52. The second rod 78 includes the actuation surface 72. The second rod 78 may also include a lip or shoulder 80 arranged to engage a lip or shoulder 82 of the valve housing 42 in the bore to inhibit the second rod 78, and thereby the valve actuator 68, from falling out of the bore in the opening direction. The overfill spring 74 is arranged to permit the first and second rods to slide relative to one another. The overfill spring 74 is disposed between the first and second rods 76, 78. The overfill spring 74 is also supported by and slidable relative to the valve housing, along the blocker axis BA. Collectively, the first and second rods 76, 78 and the overfill spring 74 can slide together within the bore 70 when the follower 24 engages and raises the actuation surface 72, to move the blocker 52 to one of the closed positions. Then, if needed, the second rod 78 can continue to move relative to the first rod and compress the overfill spring 74 if the follower 24 rises past the predetermined fill level.

Another overfill protection measure of the shut-off valve 40 is the blocker 52 itself. Because the blocker 52 comprises a spool and can be moved to a plurality of different closed positions, as described above, the blocker provides overfill protection as well. For example, even when the blocker 52 in the initial closed position shown in FIG. 5B (where the sealing head 54 just sealingly engages the interior sealing surface 60), the blocker can continue to move in the closing direction (to other closed positions), against the force of the blocker spring 66, thereby allowing the follower 24 to continue to move upward in the reservoir 12 without damaging or placing undue stress on the lubricant distribution system 10 or components thereof. After the blocker 52 moves to the closed position shown in FIGS. 5C-D, where the blocker 52 is inhibited from further movement in the closing direction due to the stop 64, then the overfill spring 74 is utilized to provide further overfill protection.

Together, the blocker spring 66 and the overfill spring 74 provide resistance against the follower 24 from rising above the predetermined fill level (the predetermined fill level being the level of the lubricant when the follower 24 has just moved the blocker 52 to the initial closed position). To ensure the shut-off valve 40 operates properly, the spring constant of the overfill spring 74 is larger (e.g., 2x, 3x, 4x, 5x, etc.) than the spring constant of the blocker spring 66. As a result, the blocker spring 66 will compress before the overfill spring 74. This ensures that the blocker 52 will be moved to one of the closed positions before the overfill spring 74 starts to be compressed. In other words, this ensures the blocker 52 will be moved to one of the closed positions before the actuation surface 72 starts moving relative to the blocker. When the blocker 52 is in the open position shown in FIG. 5A, the overfill spring 74 is generally uncompressed (any compression of the overfill spring due to the weight of the first rod 76 and due to the force from the blocker spring 66 is negligible). When the blocker 52 is in the initial closed position shown in FIG. 5B, the overfill spring 74 is also generally uncompressed. When the shut-off valve 40 is in the configuration shown in FIG. 5C, the blocker 52 is in the furthest closed position shown in FIG. 5C (which is different from the initial closed position). In this configuration, the overfill spring 74 is still uncompressed and the follower 24 has moved the valve actuator 68 just enough to push the blocker 52 into engagement with the stop 64. Because the blocker 52 is inhibited from further movement in the closing direction, further upward movement of the follower 24 moves the actuation surface 72 relative to the blocker, thereby compressing the overfill spring 74. The follower 24 can continue to compress the overfill spring 74 until the actuation surface 72 is flush with a lower end of the valve housing 42, as shown in FIG. 5D. Accordingly, FIGS. 5A-D generally show the progression of the shut-off valve during a refilling operation, with the blocker 52 starting in an open position (FIG. 5A), the blocker moving to the initial closed position (FIG. 5B), the blocker moving to the furthest closed position (FIG. 5C, if needed for initial overfill protection), and then the actuation surface 72 moving relative to the blocker (FIG. 5D, if needed for additional overfill protection).

The refilling operation of the lubricant distribution system 10 will now be described. When the lubricant level in the reservoir 12 is below the predetermined fill level (for example because the reservoir is empty), the follower 24 is spaced apart from the actuation surface 72 and the blocker 52 (due to the blocker spring 66) is in the open position. Lubricant from the lubricant supply thereby flows through the shut-off valve 40 toward the reservoir refill inlet 34 and into the reservoir 12. As the interior 22 of the reservoir 12 is refilled with lubricant, the follower 24 is raised upward. When the lubricant in the reservoir 12 nearly reaches the predetermined fill level, the follower 24 contacts the actuation surface 72 and pushes the valve actuator 68 upward, in the closing direction. As the valve actuator 68 raises, the valve actuator pushes the blocker 52 in the closing direction to any one of the closed positions. In said closed position, the blocker 52 prevents additional lubrication from flowing through the shut-off valve 40 and into the reservoir 12. Should the follower 24 continue to rise in the reservoir 12, due to overfilling, thermal expansion, leakage, improper filling, or any other reason, the blocker 52 will continue to move in the closing direction, further compressing the blocker spring 66. This provides a first or preliminary overfill protection. Should the follower 24 continue to rise in the reservoir 12 after the blocker 52 contacts the stop 64, the follower will be able to continue to rise by compressing the overfill spring 74. This provides a second or secondary overfill protection. The follower 24 may continue to rise and compress the overfill spring 74 until the actuation surface 72 is flush with the lower end of the valve housing 74 (FIG. 5D). It is understood that in embodiments where the blocker does not comprise a spool, the protection provided by the overfill spring may be the initial (and possibly only) form of overfill protection.

Referring back to FIGS. 3 and 4 and to FIGS. 6-10, the pump assembly 14 will now be further described. The pump assembly 14 is configured to pump the lubricant from the reservoir 12. As mentioned above, the pump assembly 14 includes the motor 26, the pump 28, and the drive train 30.

The motor 26 includes an output shaft 86 configured to rotate about an axis of rotation AR (FIG. 8) to drive operation of the pump 28. The drive train 30 connects the motor 26 to the pump 28 such that operation of the motor operates the pump to pump lubricant from the reservoir 12. In the illustrated embodiment, the drive train 30 includes a crank case 100. The crank case 100 operatively connects the motor 26 to the pump 28. In other embodiments, the drive train 30 may include one or more additional components (e.g., rods, shafts, linkages, etc.) operatively connecting the motor to the pump.

Figure 6:
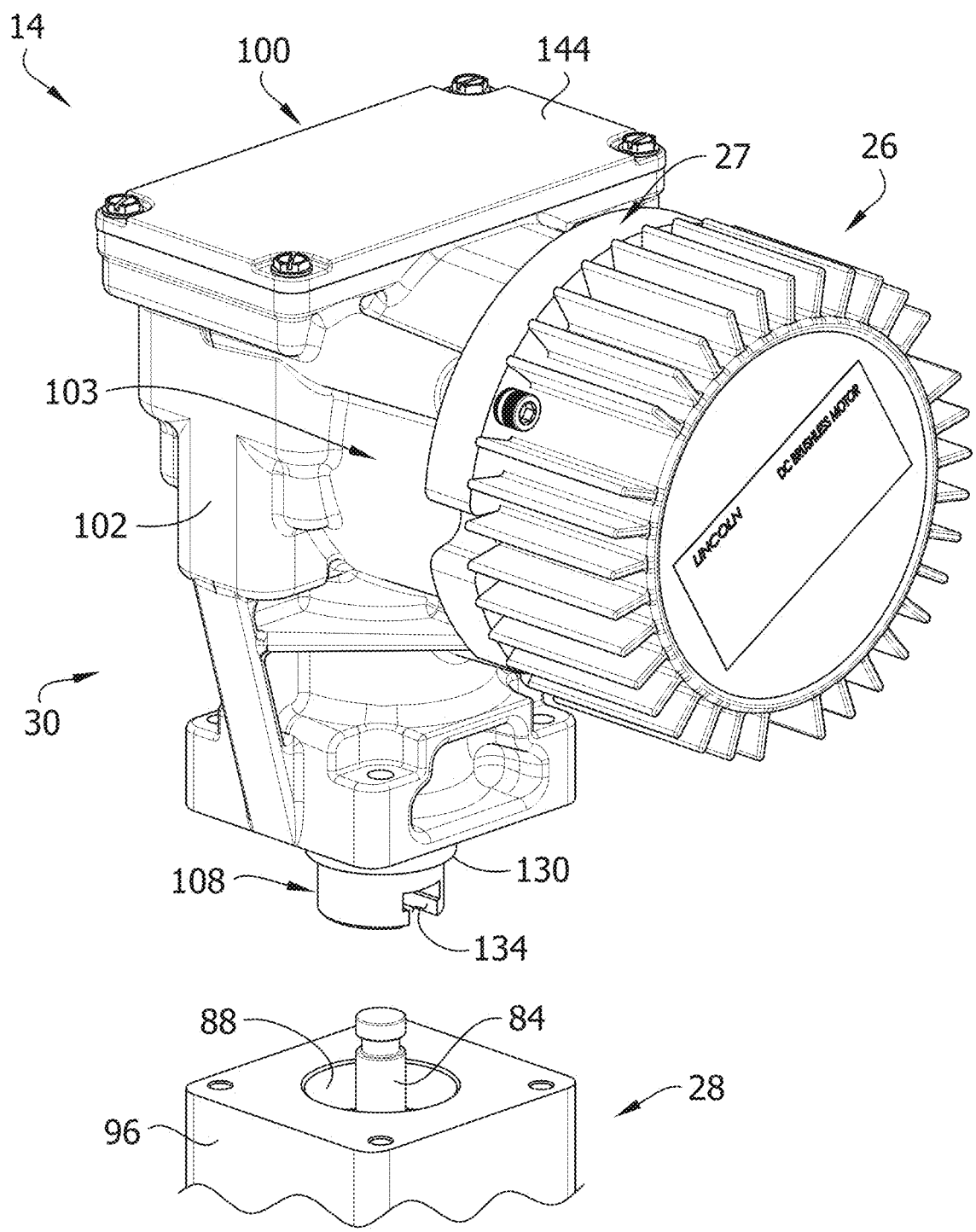
FIG. 6 is a partially exploded view of a pump assembly of the lubricant distribution system according to one embodiment of the present disclosure, the pump assembly including an electric motor.

The crank case 100 includes a housing 102 and a crank or crankshaft assembly 104 disposed in the housing (an interior thereof). The crank assembly 104 is configured to convert rotational motion from the motor 26 (specifically, rotation of the output shaft 86) into linear motion for the pump 28. With reference to FIG. 6, the pump 28 includes a pump rod 84 (broadly, pump link) that moves up and down (broadly, back and forth) to operate the pump and pump the lubricant from the reservoir 12. The pump rod 84 is connected to the drive train 30, specifically the crank assembly 104 of the crank case 100, to drive the pump rod (up and down) to operate the pump. Accordingly, the crank assembly 104 converts the rotational motion from the motor 26 into linear motion to drive linear (e.g., up and down) movement of the pump rod 84 to pump the lubricant from the reservoir 12.

Figure 8:
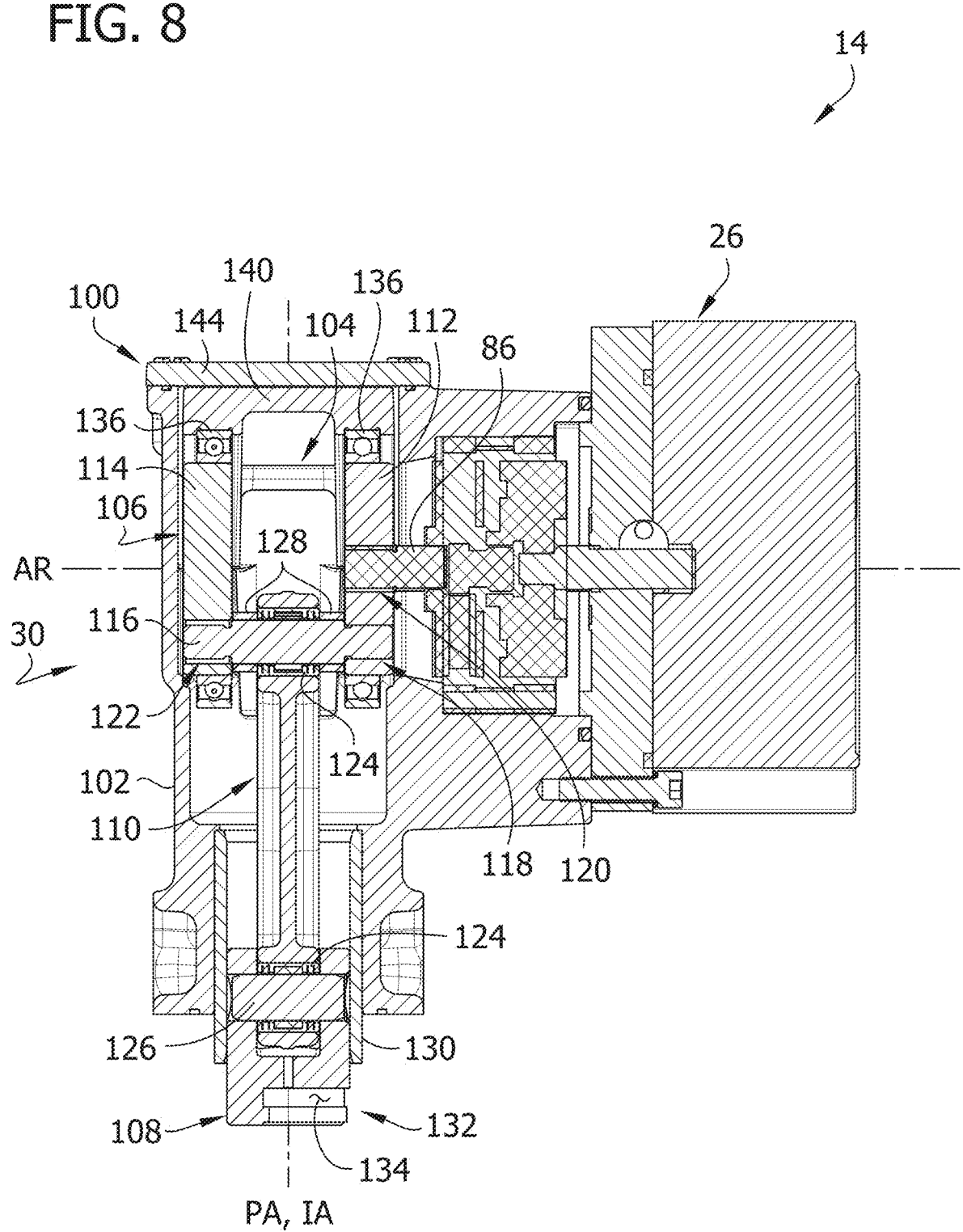
FIG. 8 is a cross-section of a crank case and an electric motor of the pump assembly of FIG. 6.
Figure 9:
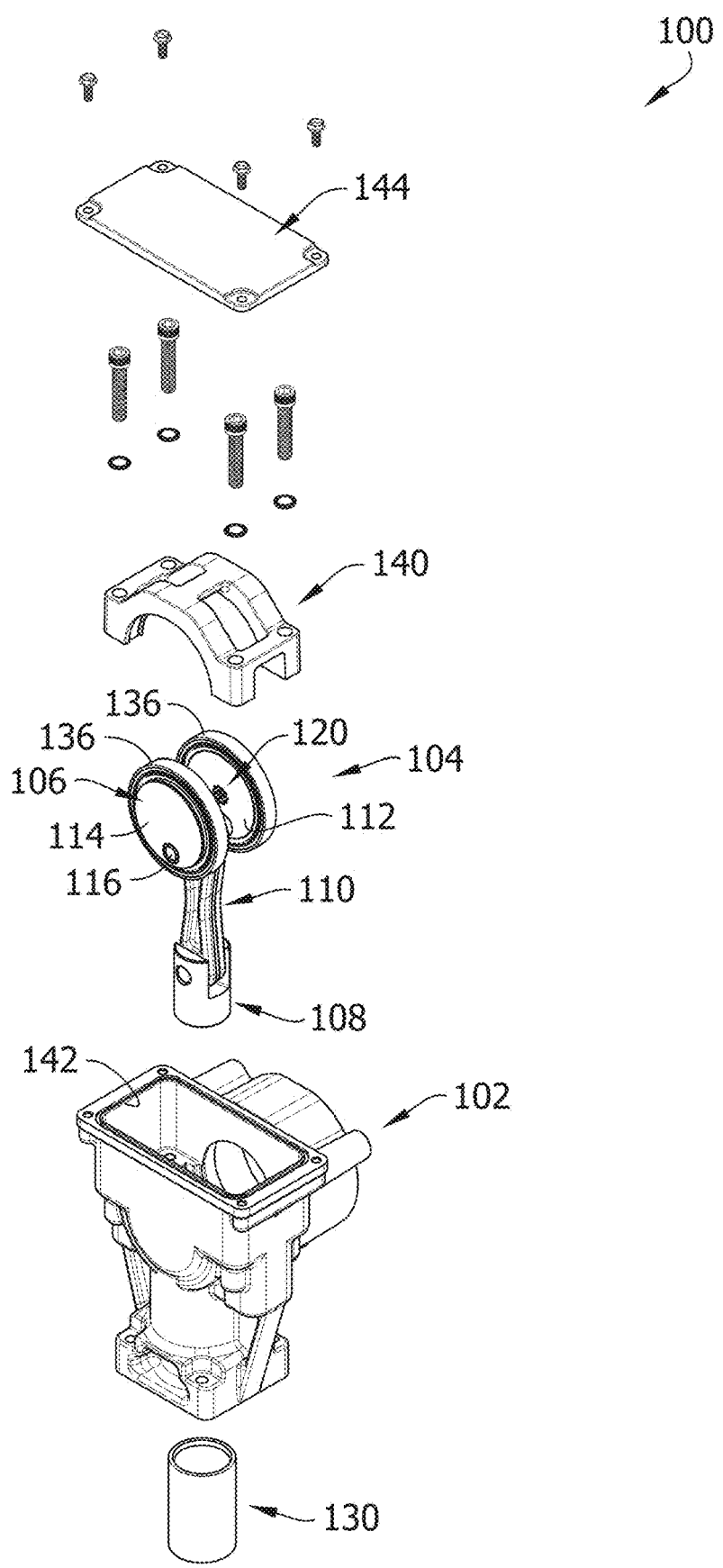
FIG. 9 is an exploded view of the crank case.

Referring to FIGS. 8 and 9, the crank assembly 104 includes a crankshaft 106, a piston or slider 108, and a connecting rod 110. The connecting rod 110 interconnects the crankshaft 106 and the piston 108. The crankshaft 106 includes a drive disk 112, an idler or follower disk 114, and a crank pin or shaft 116. The crank pin 116 extends between the drive disk 112 and the idler disk 114. The crank pin 116 is connected to the drive disk 112 via a connection 118. Desirably, the connection 118 between the crank pin 116 and the drive disk 112 is a fixed connection such that the crank pin and the drive disk are fixed (e.g., do not move) relative to one another. In one embodiment, the connection 118 between the crank pin 116 and the drive disk 112 is a press-fit connection (the end of the crank pin is pressed into the drive disk), although other connections, such as welding, fasteners, integral formation, etc., are within the scope of the present disclosure. The drive disk 112 is driven or rotated by (e.g., directly by) the motor 26. It is desirable to fix the connection 118 between the crank pin 116 and the drive disk 112 because it creates a stronger and more durable transfer of rotational force from the drive disk to the crank pin and therefore the rest of the crankshaft 106. This results in the connection 118 between the crank pin 116 and the drive disk 112 being able to have a longer useful life. The drive disk 112 includes a motor connector 120 for operatively connecting the motor 26 to the crankshaft 106. The motor connector 120 is configured to be connected (e.g., directly connected) to the motor 26 so that the motor drive rotation of the drive disk 112, and thereby the crankshaft 106. In the illustrated embodiment, the motor connector 120 connects directly to the output shaft 86 of the motor 26, although in other embodiments one or more intermediate components may connect the motor connector to the output shaft. In one embodiment, the motor connector 120 comprises a splined opening and the output shaft 86 includes splines configured to mate with the splines of the opening, although other ways of connecting the output shaft and the drive disk 112 to one another are within the scope of the present disclosure. The crank pin 116 is connected to the idler disk 114 via a connection 122. Desirably, the connection 122 between the crank pin 116 and the idler disk 114 permits the crank pin and the idler disk to rotate relative to one another. In one embodiment, the connection 122 between the crank pin 116 and the idler disk 114 is a slip-fit connection, although other types of rotational connections, such as fasteners, are within the scope of the present disclosure. Accordingly, due to the connection 122, the drive disk 112 and the idler disk 114 are able to turn or rotate relative to one another. This relative rotation between the drive disk 112 and the idler disk 114 simplifies the assembly of the crankshaft 106 by eliminating the need to concentrically align the drive and idler disks during assembly, as would be the case if the drive and idler disks where fixed relative to one another.

The connecting rod 110 is mounted or coupled to the crank pin 116 of the crankshaft 106. The crank pin 116 extends through an opening at one end of the connecting rod 110. A bearing 124 is disposed between the crank pin 116 and the connecting rod 110 to permit the crank pin and connecting rod to rotate relative to one another. In the illustrated embodiment, the crankshaft 106 includes spacers 128 disposed on the crank pin 116 for positioning (specifically, centering) the connecting rod 110 (and bearing 124) on the crank pin, between the drive and idler disks 112, 114. The other end of the connecting rod 110 is connected to the piston 108. The piston 108 includes a piston pin or shaft 126. The connecting rod 110 is mounted or coupled to the piston pin 126. The piston pin 126 extends through an opening at said other end of the connection rod 110. A bearing 124 is disposed between the piston pin 126 and the connecting rod 110 to permit the piston pin and connecting rod to rotate relative to one another.

The piston 108 is disposed in a sleeve 130 and moves linearly back and forth within the sleeve, along a piston axis PA, as the crankshaft 106 rotates. The sleeve 130 is cylindrical. Desirably, the sleeve 130 protrudes from a lower end of the housing 102. The protruding end of the sleeve 130 is configured to be received by a corresponding recess or opening 88 (FIG. 6) in a pump housing 96 of the pump 28. In this manner the sleeve 130 acts as a guide arranged to engage the pump 28 to align the pump and the crank case 100 relative to one another. This maintains concentricity and ensures the piston 108 and the pump rod 84 are aligned when the crank case 100 and the pump 28 are coupled to one another. The pump rod 84 protrudes upward from the recess 88 of the pump housing 96. The pump rod 84 of the pump 28 is connected to the piston 108. Accordingly, the piston 108 drives the back and forth linear motion of the pump rod 84 to pump the lubricant from the reservoir 12. In the illustrated embodiment, the pump rod 84 is connected to the piston 108 (generally, the crank assembly 104) via a slide connection 132. In the illustrated embodiment, the slide connection 132 comprises a t-slot 134. The upper end of the pump rod 84 includes a flange disposed above a circumferential groove that slides into the t-slot 134, thereby connecting the pump rod 84 to the piston 108. The slide connection 132 allows the pump rod 84 to be quickly and easily connected to the crank assembly 104, as opposed to say a threaded connection that requires numerous turns that can be cumbersome and time consuming to make. The pump rod 84 slides along an axis into and out of the t-slot 134. In the illustrated embodiment, the orientation of the piston 108 is such that the axis is generally parallel to the axis of rotation AR. However, it is understood the axis (generally, orientation of the t-slot 134) may any orientation that lies within a plane normal to the piston axis PA. The slide connection 132 also permits the piston 108 and the pump rod 84 to be able to rotate relative to one another. This, combined with the protruding end of the sleeve 130 received by the recess 88 in the pump housing 96 (which also allows rotation between the crank case 100 and the pump 28), allows the crank case 100 to be rotated to a plurality of different orientations relative to the pump 28. This enables to the user to select the desired orientation of the crank case 100 and the motor 26 relative to the pump 28. The user can orient the crank case 100 and the motor 26 to avoid interference with other components, such as components of the piece of equipment the lubricant distribution system 10 is mounted to. In the illustrated embodiment, the housing 102 of the crank case 100 is secured to the pump housing 96 of the pump 28 with four (broadly, one or more) fasteners. The openings receiving the fasteners in the housing 102 and pump housing 96 are arranged such that the crank case 100 can be secured to the pump 28 in one of four different orientations 90 degrees apart from one another (about the piston axis PA). In each one of the four orientations, the openings receiving the fasteners in the housing 102 and pump housing 96 line up, thereby allowing the fasteners to be inserted therein and secure the crank case 100 to the pump 28 in the selected orientation.

Figure 10:
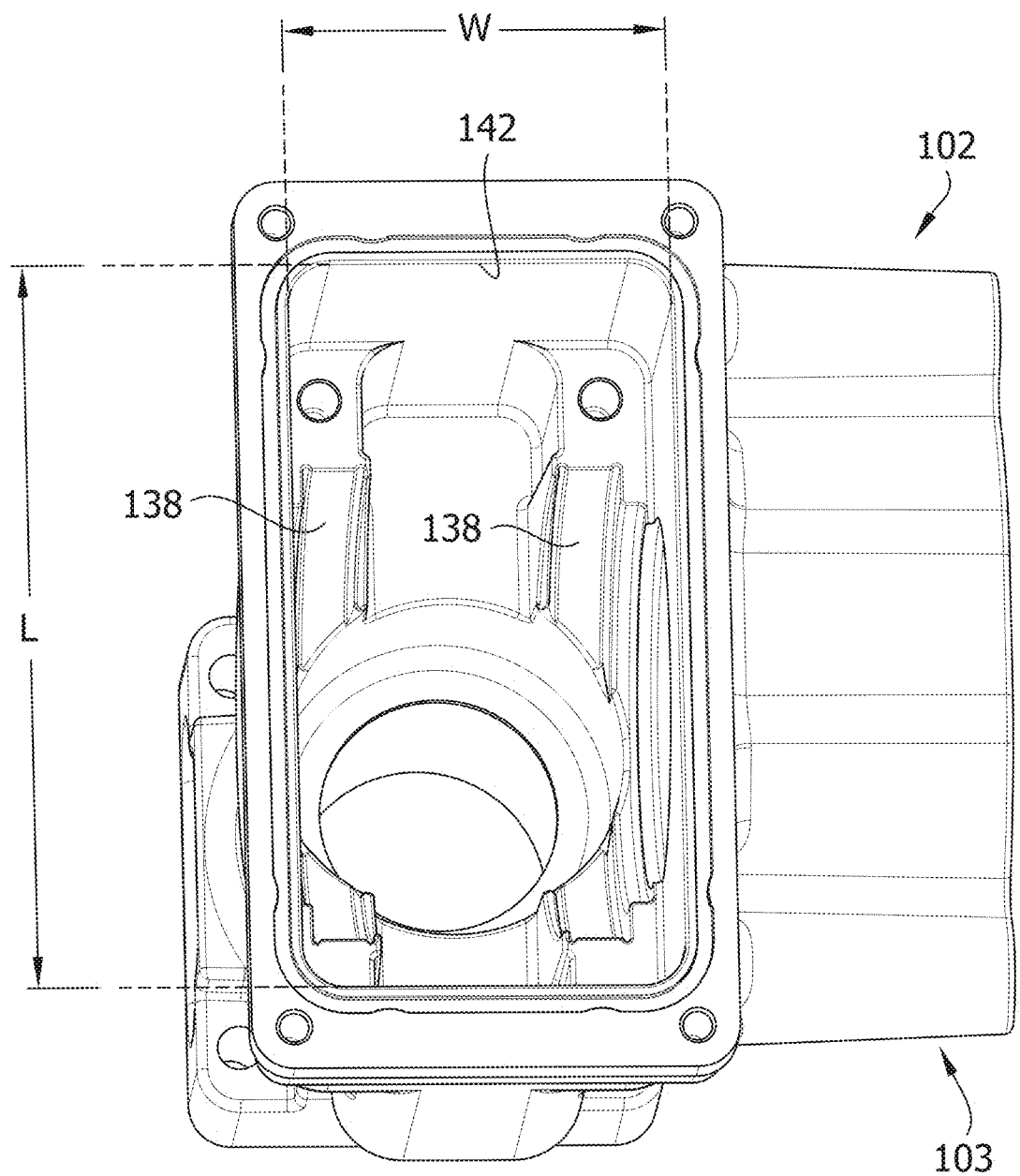
FIG. 10 is a perspective of a housing of the crank case.

Referring to FIGS. 8-10, the crankshaft 106 is simply supported (supported on both ends but is free to rotate) by the housing 102. This increases the stiffness and durability of the crankshaft 106, compared to cantilevered crankshaft constructions. The crank assembly 104 includes two crankshaft bearings 136 configured to permit the crankshaft 106 to rotate relative to the housing 102. In the illustrated embodiment, the crankshaft 106 rotates about the axis of rotation AR defined by the output shaft 86 of the motor, however it is understood the crankshaft can rotate about other axes of rotation in other configurations. Each crankshaft bearing 136 supports one of the drive and idler disks 112, 114. One crankshaft bearing 136 is disposed between the drive disk 112 and the housing 102 and the other crankshaft bearing is disposed between the idler disk 114 and the housing. In the illustrated embodiment, each crankshaft bearing 136 is mounted to (such as press fit on) the corresponding drive disk 112 or idler disk 114. The housing 102 include two bearing supports 138 (FIG. 10) in the interior of the housing configured to support the two crankshaft bearings 136. In the illustrated embodiment, the two bearing supports 138 include arcuate surfaces sized and shaped to correspond to the exterior shape of the crankshaft bearings 136. When the crank assembly 104 is installed in the housing 102, each crankshaft bearings 136 rest on one of the bearing supports 138. The crank case 100 may include a bearing journal or retainer 140 (FIG. 9) that secures the crankshaft bearings 136 in the housing 102. The bearing journal 140 is releasably connected to the housing 102 with one or more fasteners.

Desirably, the crankshaft bearings 136 each comprise a sealed bearing. Similarly, desirably the bearings 124 for the connecting rod 110 each comprise a sealed bearing. In addition, desirably, the sleeve 130 comprises an impregnated bushing. The use of sealed bearings and the impregnated bushing eliminates the need to fill the interior of the housing 102 of the crank case 100 with lubricant, such as lubricant from the reservoir 12, unlike conventional constructions. In other words, the interior of the housing 102 of the crank case 100 remains dry. This eliminates the need for the crank case 100 to have high-pressure seals, thereby reducing maintenance and the risk of oil leaks compared to crank cases that are filled with lubricant.

It is understood that other configurations of the crank assembly, such as other ways of converting rotational motion to linear motion, are within the scope of the present disclosure.

The crank case 100 of the present disclosure is configured for easily installation and removal of the crank assembly 104 into and from, respectively, the housing 102. The crank assembly 104 is at least one of installable into or removable from the housing 102 without having to disassemble the crank assembly. In the illustrated embodiment, the crank assembly 104 is both installable into and removable from the housing 102 without having to disassemble the crank assembly. In other words, the crank assembly 104 can in a fully assembled configuration—the crankshaft 106 assembled with the connecting rod 110 and crankshaft bearings 136 mounted thereto and the connecting rod being mounted to the piston 108 (as shown in FIG. 9)—before being installed in the housing 102. This enables faster and easier assembly of the crank case 100, and easier disassembly of the crank case such as for maintenance or to replace components, compared to conventional crank cases wherein the final assembly of a crank assembly occurs in the crank housing such as by the insertion of a shaft through one or more components. The housing 102 of the crank case 100 allows the fully assembled crank assembly 104 to simply be placed into and lifted out of the housing, without disconnecting any components of the crank assembly. The housing 102 includes an access opening 142. The crank assembly 104 is arranged relative to housing 102 and the access opening 142 such that the crank assembly is insertable into and removable from housing through the access opening without disassembly of the crank assembly. More specifically, the crank assembly 104 is arranged relative to housing 102 and the access opening 142 such that the crank assembly is insertable into and removable from housing through the access opening without disconnection of the crankshaft 106, the piston 108, and the connection rod 110. The access opening 142 is sized, shaped, and arranged relative to the crank assembly 104 (when the crank assembly is disposed in the interior of the housing 102) such that the crank assembly removable from housing through the access opening in the fully assembled configuration. Likewise, the crank assembly 104 is insertable into the housing 102 through the access opening 142 in the fully assembled configuration. The access opening 142 has a length L greater than a corresponding length of the crank assembly 104 and a width W greater than a corresponding width of the crank assembly. In addition, the interior of the housing 104 is sized and shaped to permit the piston 108 to move from the access opening 142 into the sleeve 130, and vice versa, unimpeded.

The access opening 142 is oriented relative to the axis of rotation AR such that the crank assembly 104 is insertable into and removable from housing 102 through the access opening along an installation axis IA that is non-parallel to the axis of rotation. In the illustrated embodiment, the access opening 142 is disposed at the top of the housing 102, such that the installation axis IA is generally vertical, thereby allowing the crank assembly 104 is lowered down into the housing and raised up out of the housing. Thus, in the illustrated embodiment, the installation axis IA is generally perpendicular to the axis of rotation AR. The installation axis IA is also generally parallel to or coextensive with the piston axis PA and normal to a plane defined by the access opening 142. The access opening 142 may be disposed at other locations on the housing 102 and/or the installation axis IA may extend at other orientations relative to the axis of rotation AR. The crank case 100 includes a lid 144 configured to close the access opening 142. One or more fasteners releasably secures the lid 144 to the housing 142, thereby closing the access opening 142.

The installation and removal of the crank assembly 104 into and from the housing 102 of the crank case 100 will now be described. To install the crank assembly 104, first the crank assembly is assembled. This includes assembling the crankshaft 106, coupling the connecting rod 110 to the crankshaft, coupling the connecting rod to the piston 108, and mounting the crankshaft bearings 136 on the crankshaft. After the crank assembly 104 is assembled, the crank assembly is aligned with the access opening 142 and then moved along the installation axis IA into the interior of the housing 102. If needed, the lid 144 is disconnected from the housing 102 to open the access opening. The crank assembly 104 is moved along the installation axis IA until the crankshaft bearings 136 engage and rest on the bearing supports 138 of the housing 102. As the crank assembly 104 is moved along the installation axis IA, the piston 108 moves toward and into the sleeve 130. After, the bearing journal 140 is inserted through the access opening 142, along the installation axis IA, into engagement with the crankshaft bearings 136 and then secured to the housing 102 with the one or more fasteners. The lid 144 is then attached to the housing 102. The motor 26 can then be attached to the crank case 100 by sliding the output shaft 86, along the axis of rotation AR, into the motor connector 120 of the drive disk 112 and then securing the motor to the housing 102 with one or more fasteners. These steps are generally reversed to remove the crank assembly 104 from the housing 102 of the crank case 100. First, the motor 26 is disconnected from the housing 102 and the output shaft 86 is disconnected from the drive disk 112 by sliding the output shaft away from the drive disk along the axis of rotation AR. The lid 144 is disconnected from the housing 102 to open the access opening 142. After, the journal bearing 140 is disconnected from the housing 102 and removed from the interior of the housing, through the access opening 142. Next, the crank assembly 104 is moved, along the installation axis IA, toward the access opening 142. During this movement, the piston 108 slides out of the sleeve 130. The crank assembly 104 is moved out of the interior of the housing 102, through the access opening 142, to complete the removal of the crank assembly 104.

Figure 7:
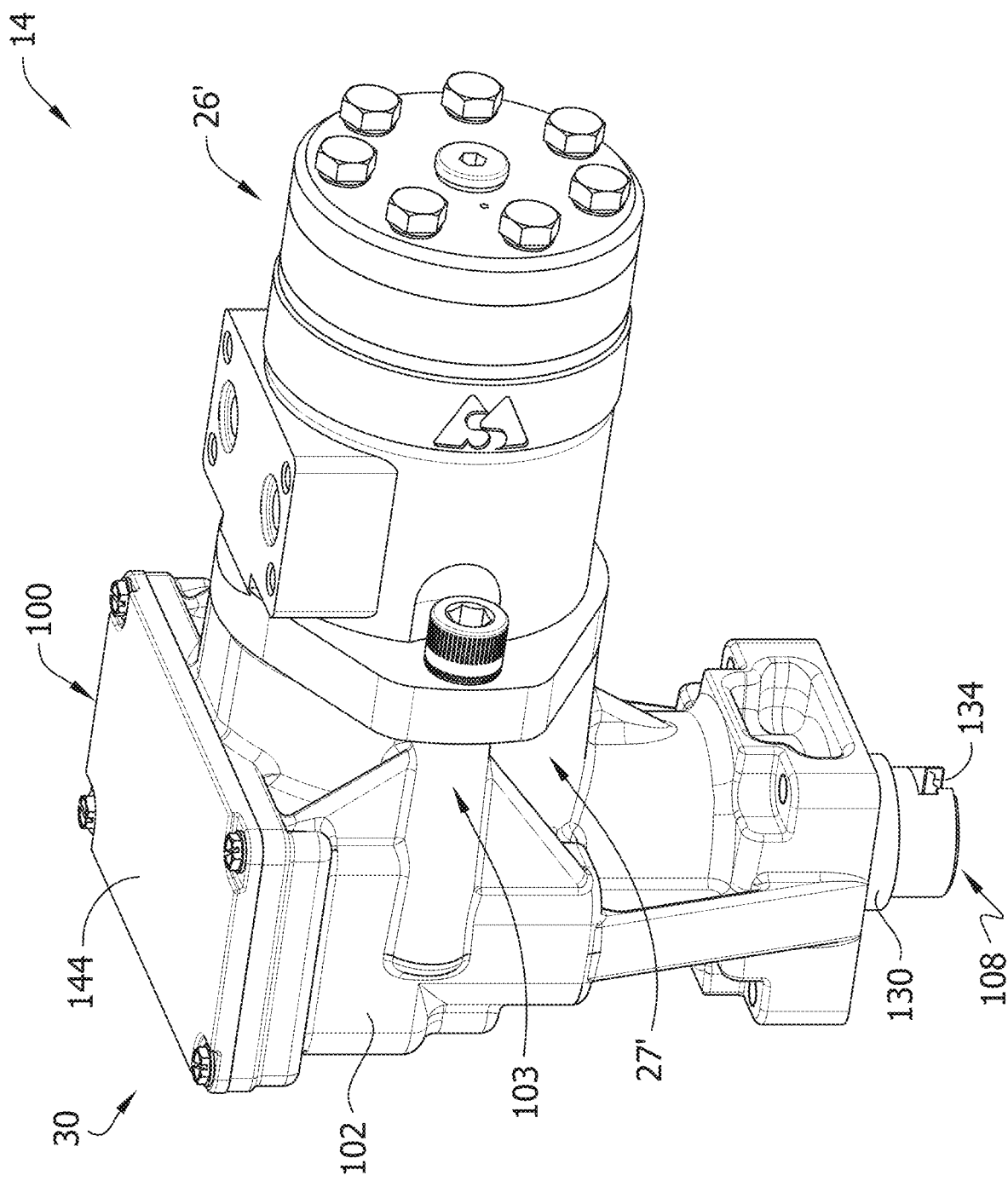
FIG. 7 is a perspective of a portion of a pump assembly according to another embodiment of the present disclosure, the pump assembly including a hydraulic motor.

The motor 26 is mounted directly on the housing 102 of the crank case 100 with one or more fasteners. In one embodiment, the motor 26 comprises an electric motor as shown in FIGS. 3, 4, 6, 8, and 9. In one embodiment, the motor comprises a hydraulic motor 26' as shown in FIG. 7. The electric motor 26 and the hydraulic motor 26' are interchangeable with one another. For example, the pump assembly 14 includes a motor connector 103 configured to operatively couple a motor to the pump 28. In this embodiment, the housing 102 of the crank case 100 forms the motor connector 103. In the illustrated embodiment, the motor connector 103 includes one or more threaded openings for receiving fasteners (e.g., bolts) that fasten the motor to the motor connector, although other types of motor connectors can be used without departing from the scope of the present disclosure. The motor connector 103 can connect the electric motor 26 or the hydraulic motor 26' to the crank case 100. In one embodiment, the lubricant distribution system 10 includes a kit of motors, the kit including the electric motor 26 and the hydraulic motor 26'. The electric motor 26 includes a connector 27 and the hydraulic motor 26' includes a connector 27'. Both connectors 27, 27' are configured to connect to the motor connector to interchangeably couple the respective electric motor 26 and the hydraulic motor 27' to the pump. In the illustrated embodiment, the connectors 27, 27' including openings that align with the threaded openings in the motor connector 103 to permit fasteners to be inserted therethrough.

Figure 11:
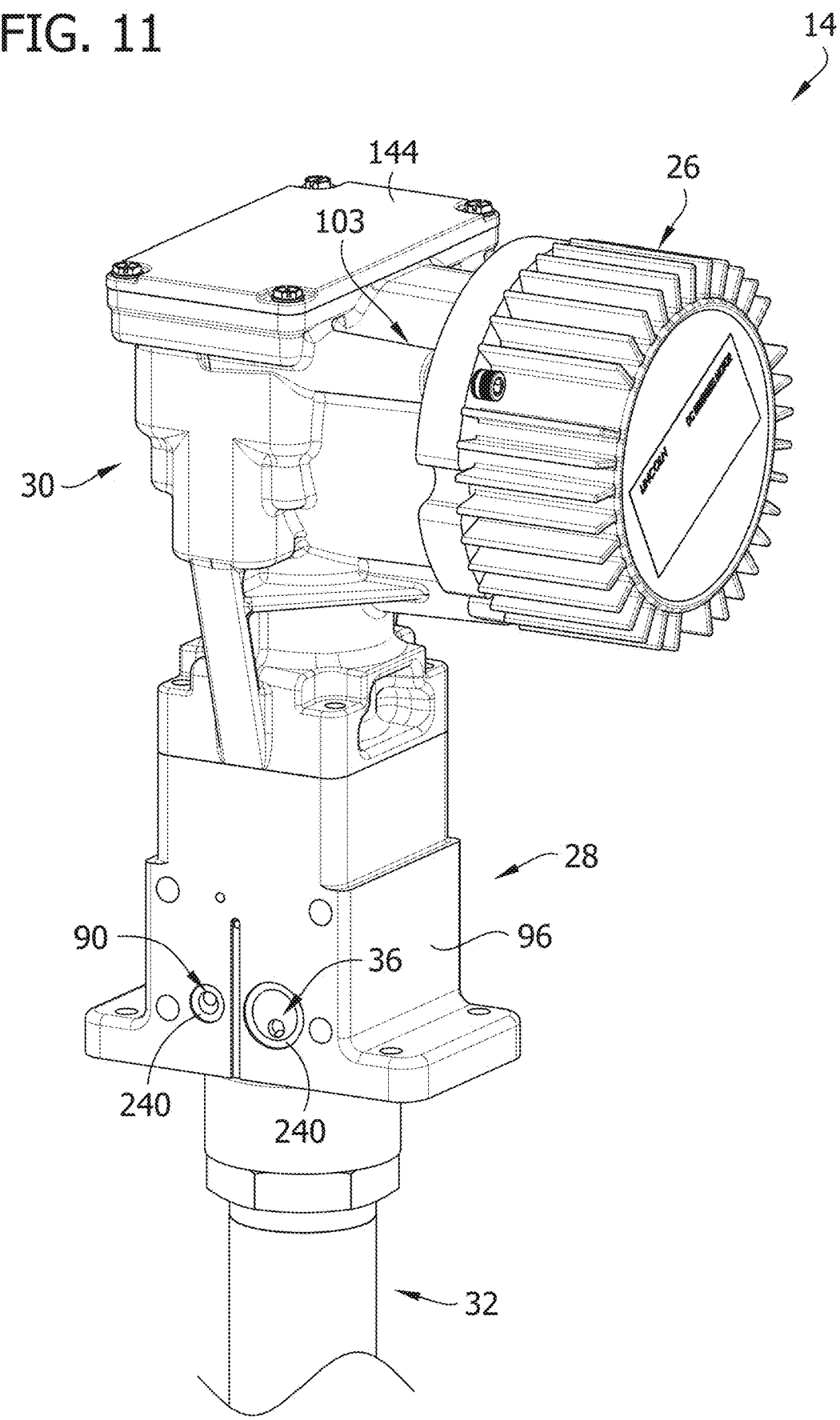
FIG. 11 is an enlarged perspective of the pump assembly of FIG. 6.
Figure 12:
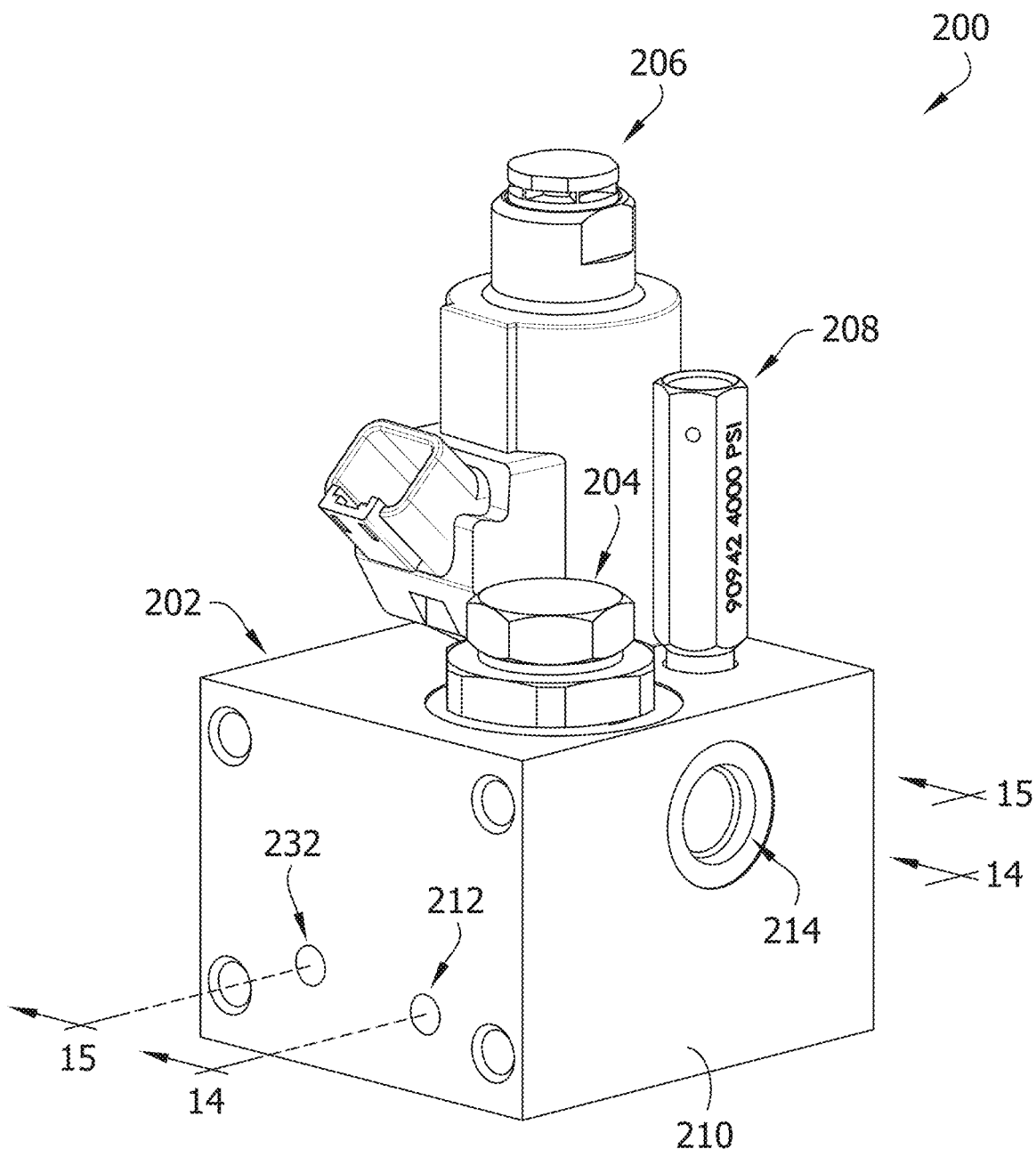
FIG. 12 is a rear perspective of a valve assembly of the lubricant distribution system according to one embodiment of the present disclosure, the valve assembly including an electrically operated vent valve.
Figure 13:
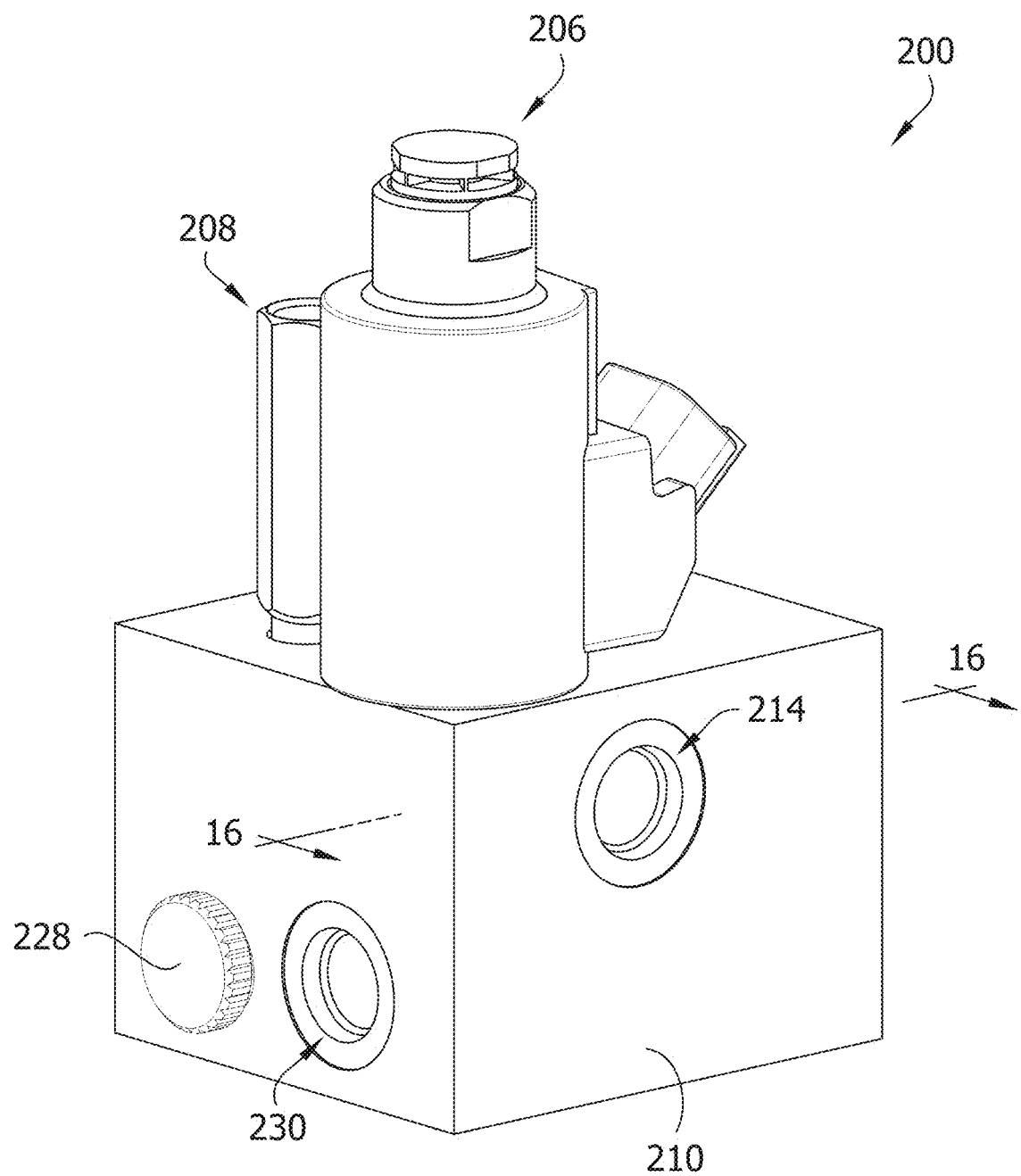
FIG. 13 is a front perspective of the valve assembly.
Figure 14:
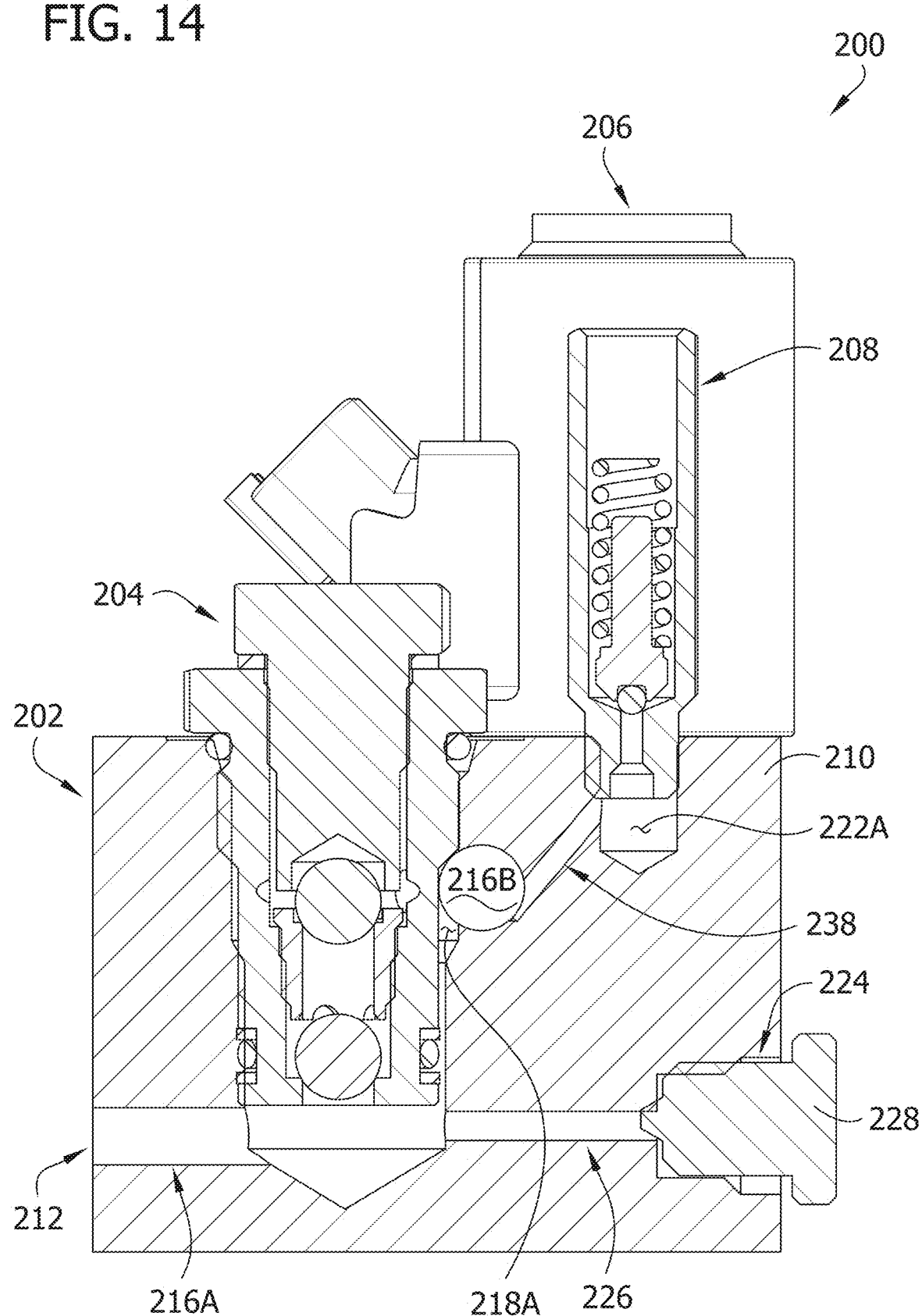
FIG. 14 is a cross-section of the valve assembly through line 14-14 of FIG. 12.

Referring to FIGS. 1, 2, and 11, the pump 28 includes a pump supply outlet 90 (FIG. 11), a pump supply inlet 92 (FIGS. 1 and 2), and pump supply passaging 94 (FIG. 2) providing fluid communication between the pump supply outlet and the pump supply inlet. The pump supply passaging 94 extends along the lance structure 32 of the pump. The pump 28 is configured to pump the lubricant from the reservoir 12 through the pump supply outlet 90. The lubricant in the reservoir 12 flows through the pump supply inlet 92, through the pump supply passaging 94, and out of the pump supply outlet 90. In this manner, the pump supply inlet 92 may also be considered a reservoir supply outlet through which lubricant flows out of the interior 22 of the reservoir. In the illustrated embodiment, the pump supply inlet 92 comprises one or more openings and/or an open lower end of the pump supply passaging 94. Other configurations of the pump supply inlet 92 are within the scope of the present disclosure. The pump supply outlet 90 and the pump refill inlet 36 are each defined by the pump housing 96 and are disposed above the lid 20 of the reservoir 12.

Referring back to FIGS. 1, 3, and 4 and to FIGS. 12-18, the lubricant distribution system 10 includes a valve assembly 200. The valve assembly 200 includes a mount (e.g., mounting block) 202 and one or more valves coupled to the mount. In the illustrated embodiment, the valve assembly 200 includes a one-way valve 204, a vent valve 206, and a pressure relief valve 208. In other embodiments, valve assembly may only include one or two (in any combination) of the one-way valve 204, the vent valve 206, or the pressure relief valve 208 coupled to the mount. The mount 202 fluidly couples the one-way valve 204, the vent valve 206, and the pressure relief valve 208 with one another. In conventional systems, the one or more valves would be fluidly connected together with hoses, leading to complex plumbing arrangements. The mount 202 eliminates the need for such hoses, simplifying the construction of the lubricant distribution system.

Referring to FIGS. 12-18, the mount 202 includes a mount body 210. Desirably, the mount body 210 is a single, unitary piece of material as illustrated. In other embodiments, the mount body may be made from multiple pieces joined together such as by welding or with fasteners. The mount body 210 may be made from any suitable material able to withstand the pressure of the lubricant, such as metal (aluminum). The mount body 210 has a one-way valve port 218. The one-way valve port 218 is configured to removably couple the one-way valve 204 to the mount body 210. The one-way valve port 218 includes a one-way valve chamber 218A sized and shaped to receive at least a portion of the one-way valve 204. In one embodiment, the one-way valve 204 is threadably coupled to the one-way valve port 218 (the one-way valve includes external threading that threadably mates with internal threading of the one-way valve port), although other ways of connecting the one-way valve to the one-way valve port are within the scope of the present disclosure. The mount body 210 has a vent valve port 220. The vent valve port 220 is configured to removably couple the vent valve 206 to the mount body 210. The vent valve port 220 includes a vent valve chamber 220A sized and shaped to receive at least a portion of the vent valve 206. In one embodiment, the vent valve 206 is threadably coupled to the vent valve port 220 (the vent valve includes external threading that threadably mates with internal threading of the vent valve port), although other ways of connecting the vent valve to the vent valve port are within the scope of the present disclosure. The mount body 210 has a pressure relief valve port 222. The pressure relief valve port 222 is configured to removably couple the pressure relief valve 208 to the mount body 210. The pressure relief valve port 222 includes a pressure relief valve chamber 222A sized and shaped to receive at least a portion of the pressure relief valve 208. In one embodiment, the pressure relief valve 208 is threadably coupled to the pressure relief valve port 222 (the pressure relief valve includes external threading that threadably mates with internal threading of the pressure relief valve port), although other ways of connecting the pressure relief valve to the pressure relief valve port are within the scope of the present disclosure. The chambers 218A, 220A, 222A may each comprise a blind bore.

The mount body 210 has a mount inlet 212. The mount inlet 212 is arranged to receive the lubricant from the pump 28. The mount body 210 has a mount outlet 214 (broadly, at least one mount outlet). The mount outlet 214 is in fluid communication with the mount inlet 212. The mount outlet 214 is arranged to supply the lubricant. Specifically, the mount outlet 214 is configured to be coupled to a single supply line (not shown) of the overall lubrication system to carry the lubricant moved by the pump toward the one or more injectors. In this manner, the mount outlet 214 may be considered a lubricant outlet of the lubricant distribution system 10. In the illustrated embodiment, the mount body 210 has two mount outlets 214. The two mount outlets 214 are disposed on opposite sides of the mount body 210. In operation, each mount outlet 214 can be attached to a corresponding single supply line or one mount outlet 214 can be attached to a single supply line and the other mount outlet can be blocked off with a plug (not shown).

The mount body 210 includes mount supply passaging 216 that fluidly connects the mount inlet 212 and the mount outlet 214. The one-way valve port 218 is fluidly disposed between the mount inlet 212 and the mount outlet 214. The mount supply passaging 216 includes a first supply section 216A extending from the mount inlet 214 to the one-way valve chamber 218A (the one-way valve chamber may be considered part of the mount supply passaging) and a second supply section 216B extending from the one-way valve chamber and the two mount outlets 214. In the illustrated embodiment, the second supply section 216B comprises a through bore through the mount body 210 that intersects the one-way valve chamber 218, with the opposite ends of the through bore forming the two mount outlets.

The mount body 210 may also include an air bleed outlet 224. The air bleed outlet 224 is arranged to vent air (including lubricant with entrained air) that becomes trapped in the plumbing (such as in the pump supply passaging 94) of the lubricant distribution system 10. The air bleed outlet 224 is in fluid communication with the mount inlet 212. In particular, the air bleed outlet 224 is in fluid communication with the mount inlet 212 without any intervening component, such as a valve (e.g., one-way valve 204), fluidly disposed therebetween. In the illustrated embodiment, the mount body 210 includes air bleed passaging 226 that fluidly connects the air bleed outlet 224 to the mount inlet 212. In the illustrated embodiment, the air bleed passaging 226 extends from the one-way valve chamber 218A, from a location that is upstream of the one-way valve 204, to the air bleed outlet 224. The valve assembly 200 includes an air bleed plug 228 for selectively opening and closing the air bleed outlet 224. For example, the air bleed plug 228 can be threadably coupled to the mount body 210. Typically, the air bleed plug 228 will be coupled to the mount body 210 to close the air bleed outlet 224. When desired, the air bleed plug 228 will be disconnected from the mount body 210 to open the air bleed outlet 224 to bleed out air, such as when a user is priming the pump 28.

The mount body 210 has a mount refill inlet 230. The mount refill inlet 230 is arranged to receive the lubricant from the lubricant supply. Specifically, the mount refill inlet 230 receives the lubricant from the lubricant supply after the lubricant flows through the shut-off valve 40. The mount refill inlet 230 is in fluid communication with the shut-off valve outlet 46. In the illustrated embodiment, the mount refill inlet 230 is connected to (broadly, configured to connect to) the refill conduit 50 extending between the shut-off valve 40 and the mount body 210. The mount body 210 has a mount refill outlet 232 (for reasons that will become apparent, the mount refill outlet may also be considered a mount return outlet). The mount refill outlet 232 is arranged to supply the lubricant to the reservoir 12 via the reservoir refill inlet 34. The mount refill outlet 232 is in fluid communication with the mount refill inlet 230. The mount body 210 includes mount refill passaging 234 that fluidly connects the mount refill outlet 232 to the mount refill inlet 230 (without any intervening components). Thus, lubricant from the lubricant supply flows from the shut-off valve 40 into the mount refill inlet 230, through the mount refill passaging 234, and out of the mount refill outlet 232.

Figure 15:
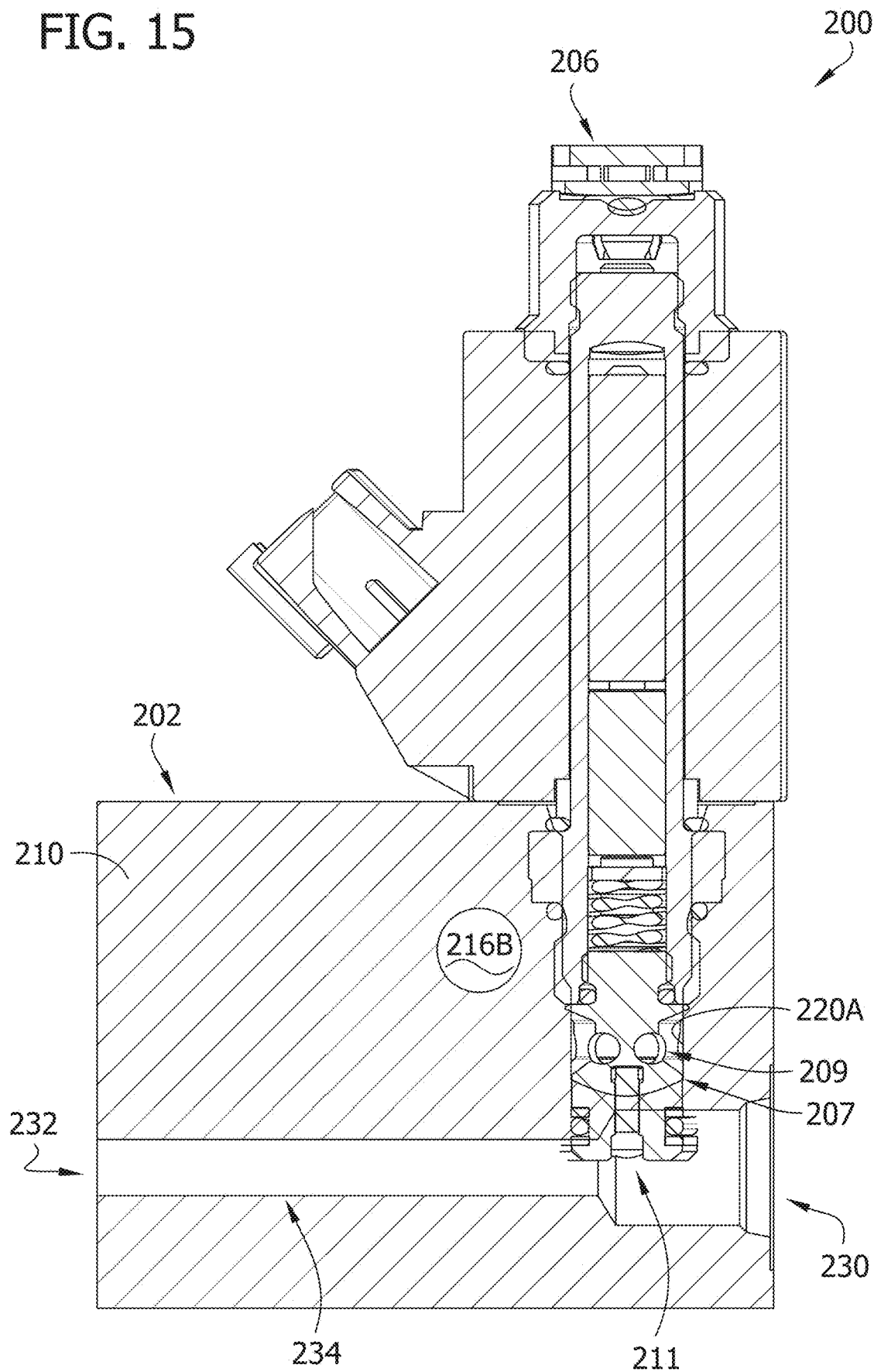
FIG. 15 is a cross-section of the valve assembly through line 15-15 of FIG. 12.
Figure 16:
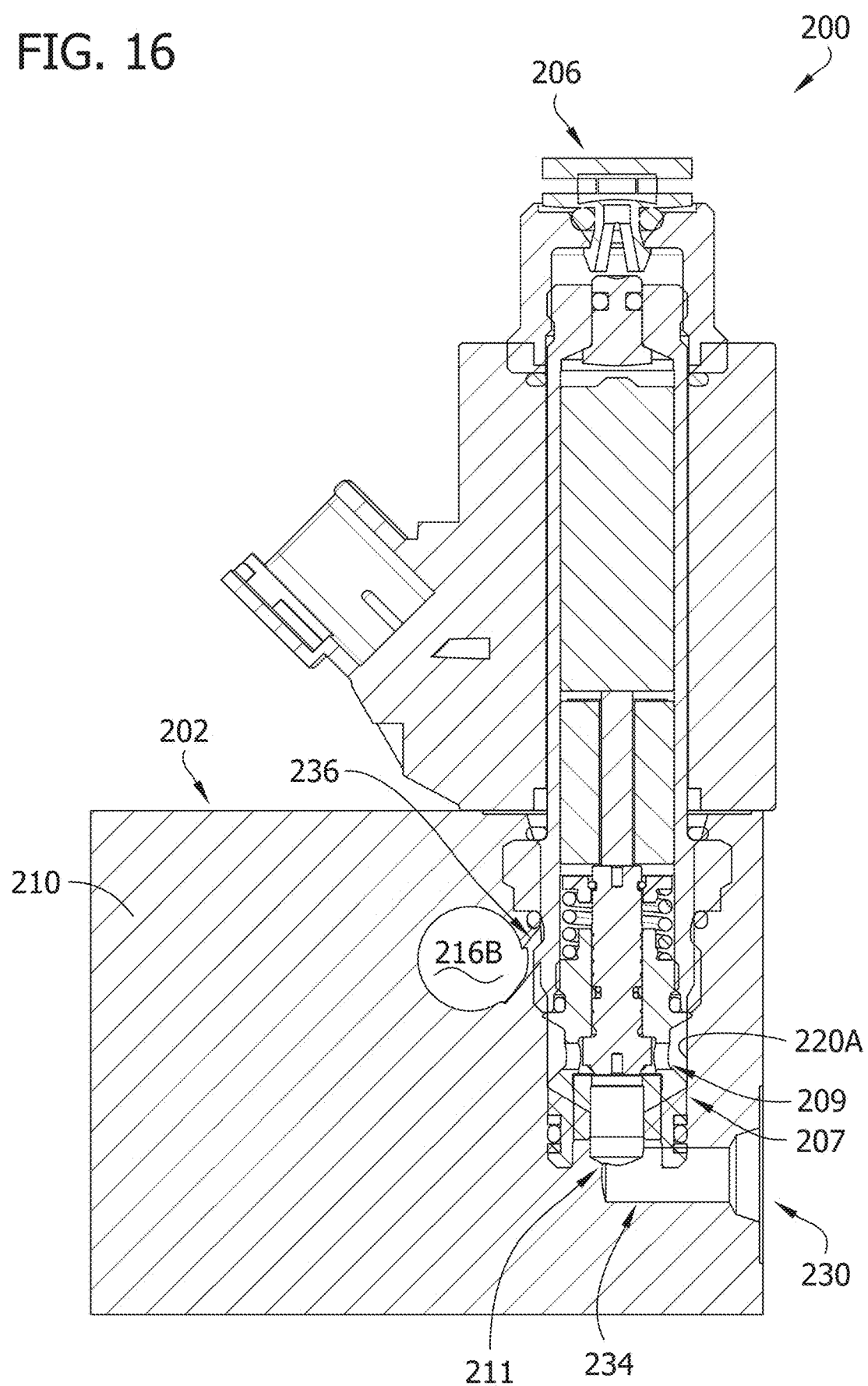
FIG. 16 is a cross-section of the valve assembly through line 16-16 of FIG. 13.
Figure 17:
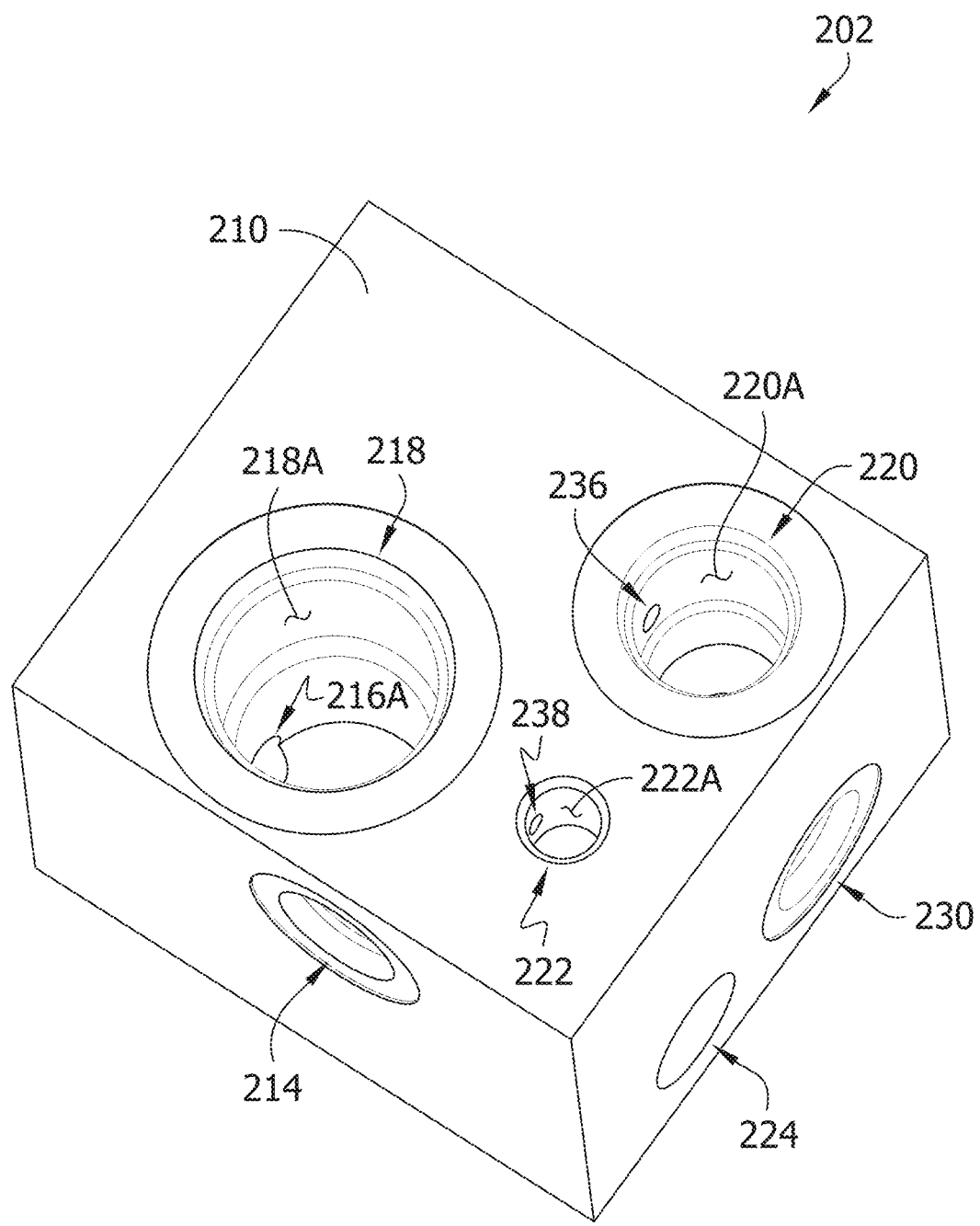
FIG. 17 is a perspective of a mount of the valve assembly.
Figure 18:
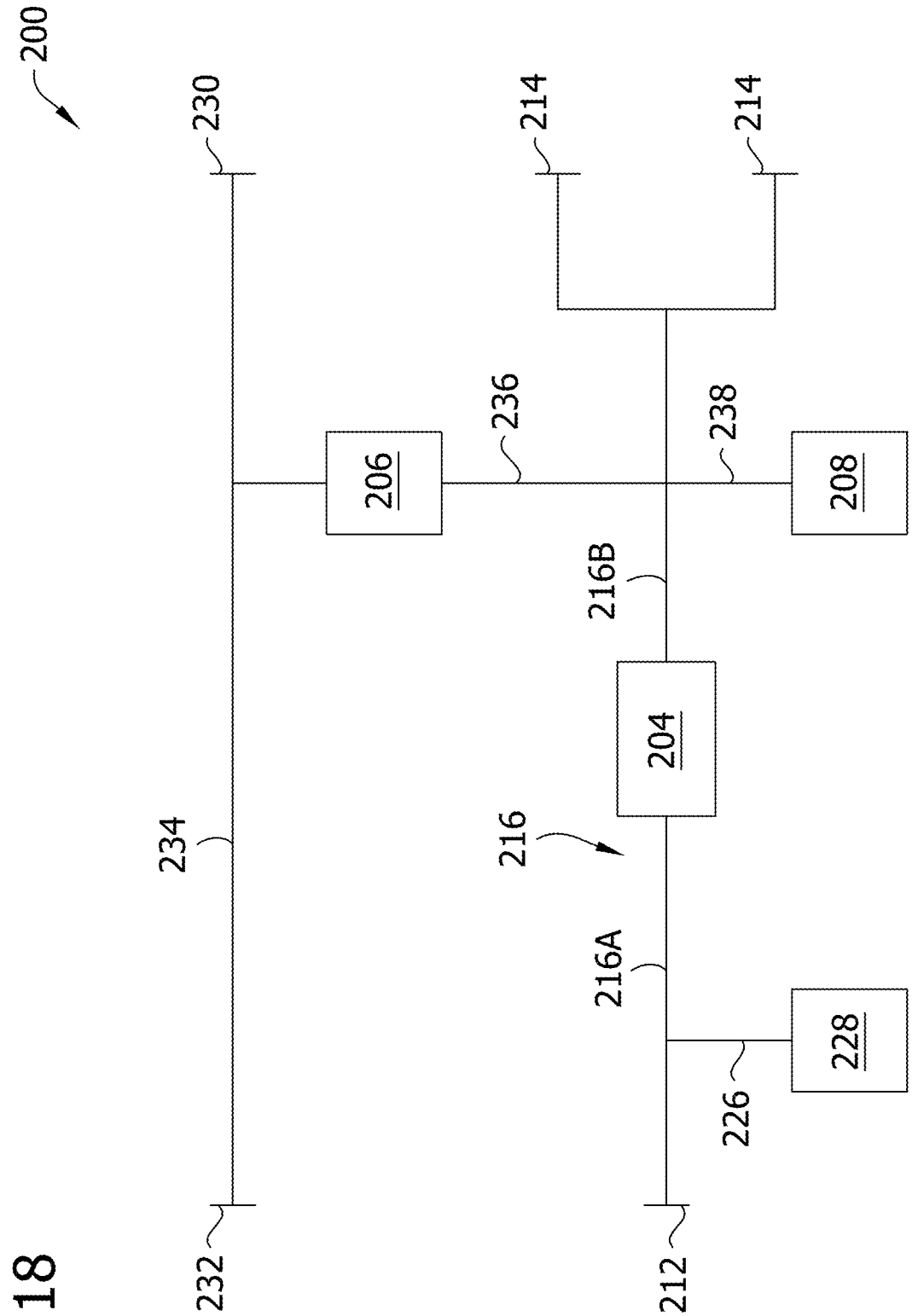
FIG. 18 is a schematic diagram of the valve assembly.

The mount refill outlet 232 is in fluid communication with each of the mount outlets 214. The vent valve port 220 is fluidly disposed between the mount refill outlet 232 and the mount outlets 214. The mount body 210 includes vent passaging 236 that fluidly connects the vent valve port 220 to the mount outlets 214. In the illustrated embodiment, the vent passaging 236 extends from the second supply section 216A to the vent valve chamber 220A (FIG. 16). The vent valve chamber 220A is intersected by the mount refill passaging 234 (the vent valve chamber may be considered part of the vent passaging). Thus, each mount outlet 214 is fluidly connected to the mount refill outlet 232 through the vent valve port 220 (FIG. 15). The mount outlets 214 are each in fluid communication with the pressure relief port 222. The mount body 210 includes pressure relief passaging 238 that fluidly connects the pressure relief port 222 to the mount outlets 214. In the illustrated embodiment, the pressure relief passaging 238 extends from the second supply section 216A to the pressure relief valve chamber 222A (FIG. 14) (the pressure relief chamber may be considered part of the pressure relief passaging). The pressure relief port 222 and the vent valve port 220 are each downstream of the one-way valve port 218.

Referring to FIGS. 1-4 and 11-18, in the assembled lubricant distribution system 10, the valve assembly 200 is directly mounted to the pump 28. The mount 202 (specifically, the mount body 210) is directly mounted to the pump 28. For example, one or more fasteners may attach the mount body 210 to the pump housing 96 of the pump 28. The mount inlet 212 is in fluid communication with the pump supply outlet 90. The mount refill outlet 232 is in fluid communication with the pump refill inlet 36. Thus, the mount refill outlet 232 is in fluid communication with the reservoir refill inlet 34. Gaskets 240 (FIG. 11), such as O-rings, may be disposed between the mount 202 and the pump housing 96 for sealing the fluid connection between the mount inlet 212 and the pump supply outlet 90 and the fluid connection between the mount refill outlet 232 and the pump refill inlet 36. When assembled, the lubricant pumped by the pump 28 flows out of the pump supply outlet 90, into the mount inlet 212, through the mount supply passaging 216, and out one or both of the mount outlets 214. Further, the lubricant from the lubricant supply flows from the shut-off valve 40, into the mount refill inlet 230, through the mount refill passaging 234, through the mount refill outlet 232 and toward the reservoir refill inlet 34.

In the assembled lubricant distribution system 10, the one-way valve 204 is removably coupled to the one-way valve port 218. Accordingly, the one-way valve 204 is fluidly disposed between the mount inlet 212 and each of the mount outlets 214. The one-way valve is arranged to permit the flow of lubricant from the mount inlet 212 to each of the mount outlets 214 and to prevent the flow of lubricant from the mount outlets to the mount inlet. Arranging the one-way valve 204 upstream of the two mount outlets 214 (broadly, at least one mount outlet) eliminates the need for the lubricant distribution system 10 to have multiple one-way valves. Conventional systems typically include a one-way valve for each outlet that connects to a single supply line. In the illustrated embodiment, the one-way valve 204 comprises a check valve, such as a dual check valve, although the use of other types of one-way valves is within the scope of the present disclosure. The one-way valve 204 includes an inlet at the lower end and an outlet disposed above the inlet, along the side of the one-way valve. The one-way valve port 218 is sized and shaped to provide a clearance between the inlet and the bottom of the one-way valve chamber 218A and a clearance between the outlet and the side of the one-way valve chamber so that the lubricant can flow from the first supply section 216A into a lower portion of the one-way valve chamber, into the inlet of the one-way valve, out of the outlet of the one-way valve into an upper portion of the one-way valve chamber, and into the second supply section 216B. The one-way valve 204 creates a seal, via a gasket, with the one-way valve port 218 which defines and separates the lower and upper portions of the one-way valve chamber.

The vent valve 206 is removably coupled to the vent valve port 220. Accordingly, the vent valve 206 is fluidly disposed between each mount outlet 214 and the mount refill outlet 232. The vent valve 206 is arranged to relieve lubricant pressure at the mount outlets 214. Relieving the lubricant pressure generated by the pump 28 at the mount outlets 214, relieves the lubricant pressure within the single supply lines and at the one or more injectors, thereby allowing the injectors to reset to dispense the next dose of lubricant. The vent valve 206 is configured to selectively permit the flow of lubricant toward the reservoir 12 via the mount refill outlet 232 and the reservoir refill inlet 34 to relieve lubricant pressure at the mount outlets 214. When closed, the vent valve 206 prevents the flow of lubricant from the mount outlets 214 toward the mount refill outlet 232. When opened, the vent valve 206 permits the flow of lubricant from the mount outlets 214 toward the mount refill outlet 232. Thus, the vented lubricant is directed back into the interior 22 of the reservoir 12. The vent valve 206 can comprise an electrically operated vent valve or a hydraulically operated vent valve. Thus, the vent valve port 220 is configured to interchangeably couple to an electrically operated vent valve and a hydraulically operated vent valve. Typically, the lubricant distribution system 10 will include the electrically operated vent valve when the motor 26 is an electric motor and will include the hydraulically operated vent valve when the motor is a hydraulic motor 26'. Although it is understood the lubricant distribution system 10 can include the electrically operated vent valve when the motor is a hydraulic motor 26' and can include the hydraulically operated vent valve when the motor is the electric motor 26. In the embodiment shown in FIGS. 1, 3, and 4 and to FIGS. 12-18, the vent valve 206 comprises the electrically operated vent valve. The electrically operated vent valve 206 includes a connector (e.g., port connector) 207 configured to couple to the vent valve port 220. In one embodiment, the connector 207 includes threading (e.g., external threading) to threadably couple the electrically operated vent valve 206 to the vent valve port 220, although other ways of connecting the electrically operated vent valve to the vent valve port can be used without departing from the scope of the present disclosure. The electrically operated vent valve 206 includes an inlet 209 and an outlet 211 fluidly coupled to the inlet. In the illustrated embodiment, the inlet 209 includes a plurality of openings, spaced circumferentially around the vent valve 206. The connector 207 is configured such that when the connector is connected to the vent valve port 220 the inlet 209 is located to receive lubricant downstream from the mount outlet 214 and the outlet 211 is located to dispense lubricant toward the mount return outlet 232. In the illustrated embodiment, the inlet 209 is disposed in the vent valve chamber 220A and receives lubricant from the vent valve chamber. The outlet 211 is disposed either at the bottom of the vent valve chamber 220A or in the mount refill passaging 234 and is arranged to direct the lubricant into the mount refill passaging. Electrically operated vent valves are known in the art and, thus, a more detailed description is omitted herein. Further details on a hydraulically operated vent valve suitable for use with the lubricant distribution system 10 of the present disclosure are provided below.

The pressure relief valve 208 is removably coupled to the pressure relief valve port 222. Accordingly, the pressure relief valve 208 is in fluid communication with the mount outlets 214. The pressure relief valve 208 configured to relieve the lubricant pressure at the mount outlets 214 when the lubricant pressure exceeds a threshold pressure. The threshold pressure is larger than the pressure required by the injectors to dispense lubricant. Injectors typically operate with a lubricant pressure within a range of about 2,500 psi to about 3,500 psi. In one embodiment, the threshold pressure for the pressure relief valve 208 is about 4,000 psi. As mentioned above, relieving the lubricant pressure at the mount outlets 214, relieves the lubricant pressure within the single supply lines and at the one or more injectors. Relieving the lubricant pressure via the pressure relief valve 208 prevents the pump 28 from over pressurizing the lubricant in the lubrication system (e.g., in the mount 202, in the single supply lines, etc.) and damaging components of the lubrication system. In the illustrated embodiment, the pressure relief valve 208 is arranged to vent the lubricant to the surrounding environment.

The valve assembly 200 of the present disclosure allows the one-way valve 204, the vent valve 206, and the pressure relief valve 208 to be serviced, replaced, or cleaned without the need to disconnect other components (such as the pump 28, the single supply lines, or other hoses or fittings) of the lubrication system. This lowers the risk of contamination or error and shortens the servicing time. For example, conventional lubrication systems include an inline check valve that requires an operator to disconnect two hose fitting to disconnect and remove the check valve from the system.

The operation of the valve assembly 200 will now be described. As the pump 28 pumps the lubricant from the reservoir 12, the lubricant flows into the mount inlet 212, along the mount supply passaging 216 and through the one-way valve 204, and through the mount outlets 214 into the single supply lines coupled thereto. In this operation, the vent valve 208 is closed. The one-way valve 204 prevents the lubricant from flowing back into the reservoir 12 via the mount inlet 212. The pump 28 continues to pump the lubricant to build the pressure in the single supply lines to activate the injectors. After the injectors have dispensed the lubricant, the vent valve 206 is opened (and the pump 28 will stop). This allows the lubricant to flow from the mount outlets 214, along the mount refill passaging 234 and through the vent valve 208, through the mount refill outlet 232, and toward the reservoir refill inlet 34 (via the pump refill inlet 36 and the pump refill passaging 38) to flow back into the reservoir 12. Allowing the lubricant to flow through the vent valve 208 reduces the lubricant pressure, thereby allowing the injectors to reset. When the vent valve 208 is open, the pump 28 will stop operating. If the pressure downstream of the one-way valve 204 (such as at the mount outlets 214, in the single supply lines, or at the injectors) exceeds the threshold pressure, the pressure relief valve 208 will open to permit the flow of lubricant therethrough to reduce the pressure. For example, the lubricant pressure may exceed the threshold pressure if a lubricant blockage forms.

Figure 19:
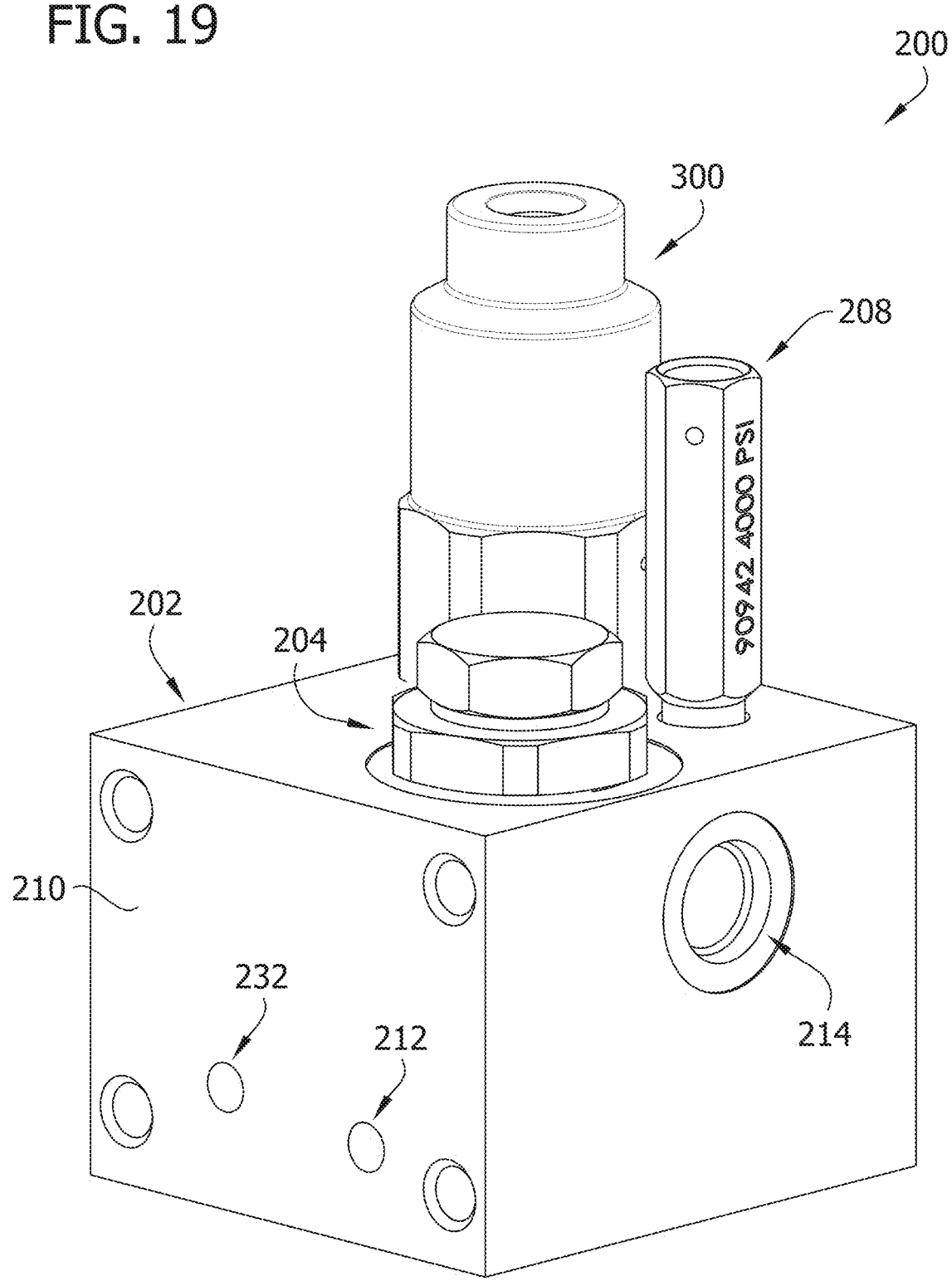
FIG. 19 is a perspective of a valve assembly according to another embodiment of the present disclosure, the valve assembly including a hydraulically operated vent valve.
Figure 20:
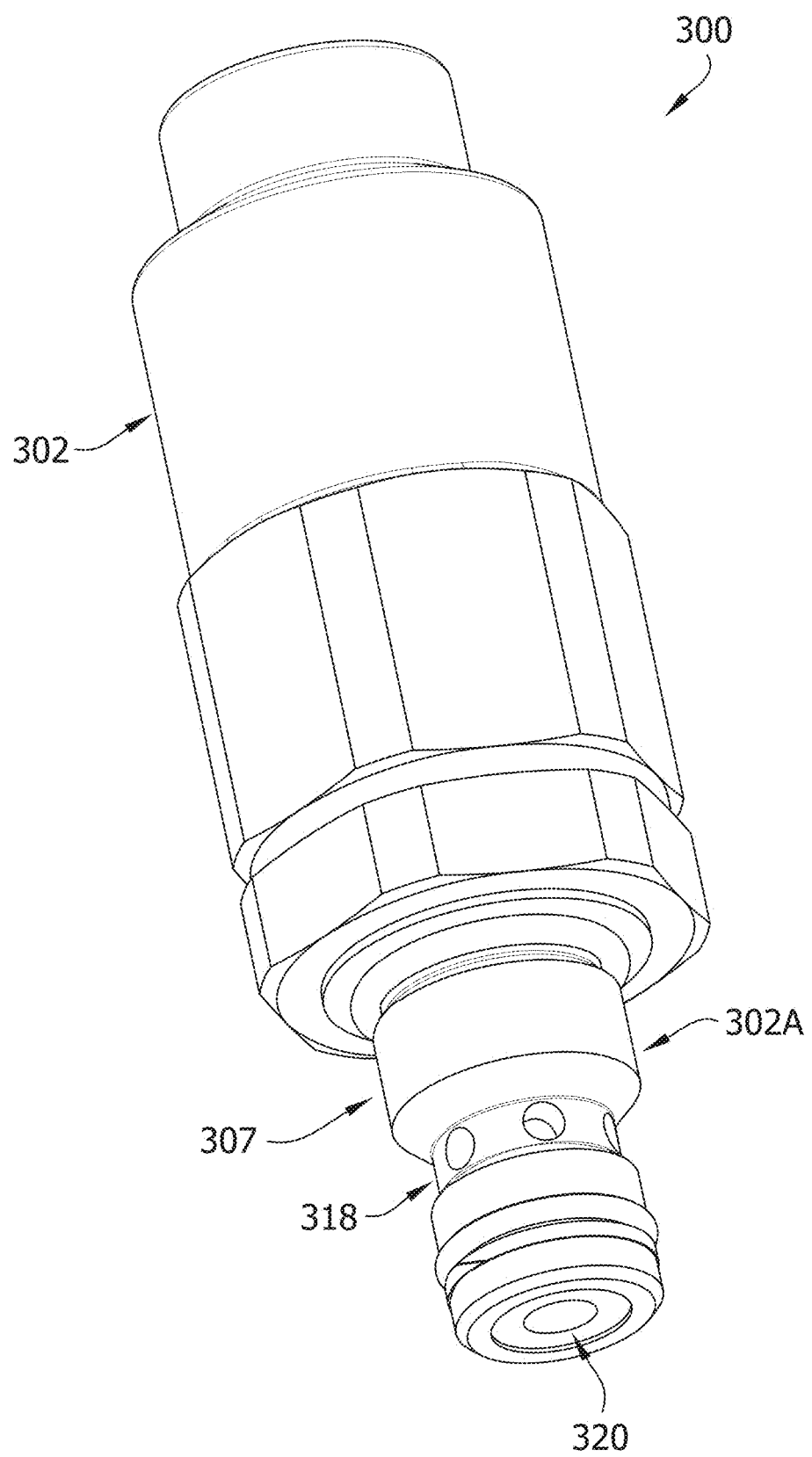
FIG. 20 is a perspective of the hydraulically operated vent valve.

Referring to FIGS. 19-21B, a vent valve according to one embodiment of the present disclosure is generally indicated at reference numeral 300. As shown in FIG. 19, the vent valve 300 is usable with the mount 202 to serve as the vent valve for the lubricant distribution system 10 of the present disclosure. In other words, the vent valve 300 of FIGS. 19-21B can be the vent valve 206 described above. The vent valve 300 is a hydraulically operated vent valve. Vent valves come in different varieties such as (1) pneumatic, (2) hydraulic, (3) electric, and (4) mechanical. Each variety of vent valve operates by its own unique mechanism different from the other varieties. For example, electrically operated vent valves energize a solenoid coil to open and/or close the valve. Hydraulically operated vent valves use a pressurized piston to keep the valve closed. The different varieties of vent valves have different configurations and assemblies that are not compatible with each other. As such, it is not possible to simply swap out one variety of conventional vent valve with another variety of vent valve. Unlike these conventional vent valves, the hydraulically operated vent valve 300 of the present disclosure is interchangeable with an electrically operated vent valve, such as the vent valve 206 shown in FIGS. 1, 3, and 4 and to FIGS. 12-18. Both the electrically operated vent valve 206 and the hydraulically operated vent valve 300 are connectable to the vent valve port 220 of the mount 202 without having to modify, reconfigure, or otherwise convert the mount to be used with the particular variety of vent valve.

The vent valve 300 includes a valve housing 302 and a blocker 304. The blocker 304 is supported by the housing 302. The blocker 304 is movably disposed in the housing 302. The housing 302 includes an interior having a chamber 306 and a longitudinal bore 308 extending from the chamber. In the illustrated embodiment, the blocker 304 comprises a piston having a head 310 disposed in the chamber 306 and a slide rod or shaft 312 disposed in the bore 308. The bore 308 defines a valve axis VA along which the head 310 and the slide rod 312 of the blocker 304 move along. A hydraulic port 314 is disposed at one end of the chamber 306. The hydraulic port 314 is configured to be connected to a hydraulic conduit or line (not shown). Together, the hydraulic port 314 and the head 310 define a pressure section 306A of the chamber 306. During operation, the pressure section 306A is filled and pressurized with a fluid (such as hydraulic fluid) from the hydraulic conduit connected to the hydraulic port 314. This expands the pressure section 306A by forcing the blocker 304 (specifically, the head 310) to move, along the valve axis VA, from the position shown in FIG. 21A to the position shown in FIG. 21B to close the vent valve 300. In one embodiment, the pressure section 306A may be pressurized to within the range of about 350-400 psi to move the blocker 304 to the closed position and hold the blocker in the closed position. The head 310 includes a first gasket 316 that forms a seal with the interior surface of the housing 302 bounding the chamber 306. The housing 302 also includes a second gasket 332 that forms a seal with the slide rod 312.

The housing 302 includes an insertion portion 302A sized and shaped to be inserted into the vent valve chamber 220A of the vent valve port 220 of the mount 202. The insertion portion 302A includes a connector (e.g., port connector) 307 configured to couple to the vent valve port 220 of the mount 202. In one embodiment, the connector 307 includes threading (e.g., external threading) to threadably couple the hydraulically operated vent valve 300 to the vent valve port 220, although other ways of connecting the hydraulically operated vent valve to the vent valve port can be used without departing from the scope of the present disclosure. The insertion portion 302A (generally, the housing 302) includes a first opening 318, a second opening 320, and valve passaging 322 providing fluid communication between the first and second openings. In the illustrated embodiment, the first opening 318 includes a plurality of openings, spaced circumferentially around the insertion portion 302A. The vent valve 300 is a bi-direction vent valve, meaning the vent valve can vent in two directions: a first flow direction being from the first opening 318 toward the second opening 320 and a second flow direction (generally opposite the first flow direction) being from the second opening toward the first opening. Accordingly, the first opening 318 can be considered an inlet and the second opening 320 can be considered an outlet when the vent valve 300 vents in the first flow direction. Likewise, the first opening 318 can be considered an outlet and the second opening 320 can be considered an inlet when the vent valve 300 vents in the second flow direction. Conventional hydraulic vent valves can only vent in one direction. When used in the lubricant distribution system 10 of the present disclosure, the vent valve 300 vents in the first flow direction. However, in other contexts, including other lubricant distribution systems, the vent valve 300 may vent in the second flow direction.

The first opening 318 faces in a first direction and the second opening faces in a second direction, different from the first direction. In one embodiment, the first and second directions are non-parallel to one another. In the illustrated embodiment, the first and second directions are generally perpendicular. The first direction is generally perpendicular or laterally outward relative to the valve axis VA and the second direction is generally parallel to the valve axis. In the illustrated embodiment, the first opening 318 is arranged to permit the lubricant to move into or out of a side of the housing 302. The second opening 320 is arranged to permit the lubricant to move into or out of an end (such as a lower end) of the housing 302. Other configurations and arrangements of the first and second openings are within the scope of the present disclosure. With reference to use with the mount 202 of the present disclosure, the connector 307 is configured such that when the connector is connected to the vent valve port 220 the first opening 318 (e.g., inlet) is located to receive lubricant downstream from the mount outlet 214 and the second opening 320 (e.g., outlet) is located to dispense lubricant toward the mount return outlet 232. The arrangement or positioning of the first opening 318 and the second opening 320 of the hydraulically operated vent valve 300 relative to the vent valve port 220 is substantially similar (if not identical) to the arrangement or positioning of the inlet 209 and the outlet 211, respectively, of the electrically operated vent valve 206 relative to the vent valve port. For example, the first opening 318 is disposed in the vent valve chamber 220A and receives lubricant from the vent valve chamber. The second opening 320 is disposed either at the bottom of the vent valve chamber 220A or in the mount refill passaging 234 and is arranged to direct the lubricant into the mount refill passaging.

Figure 21A:
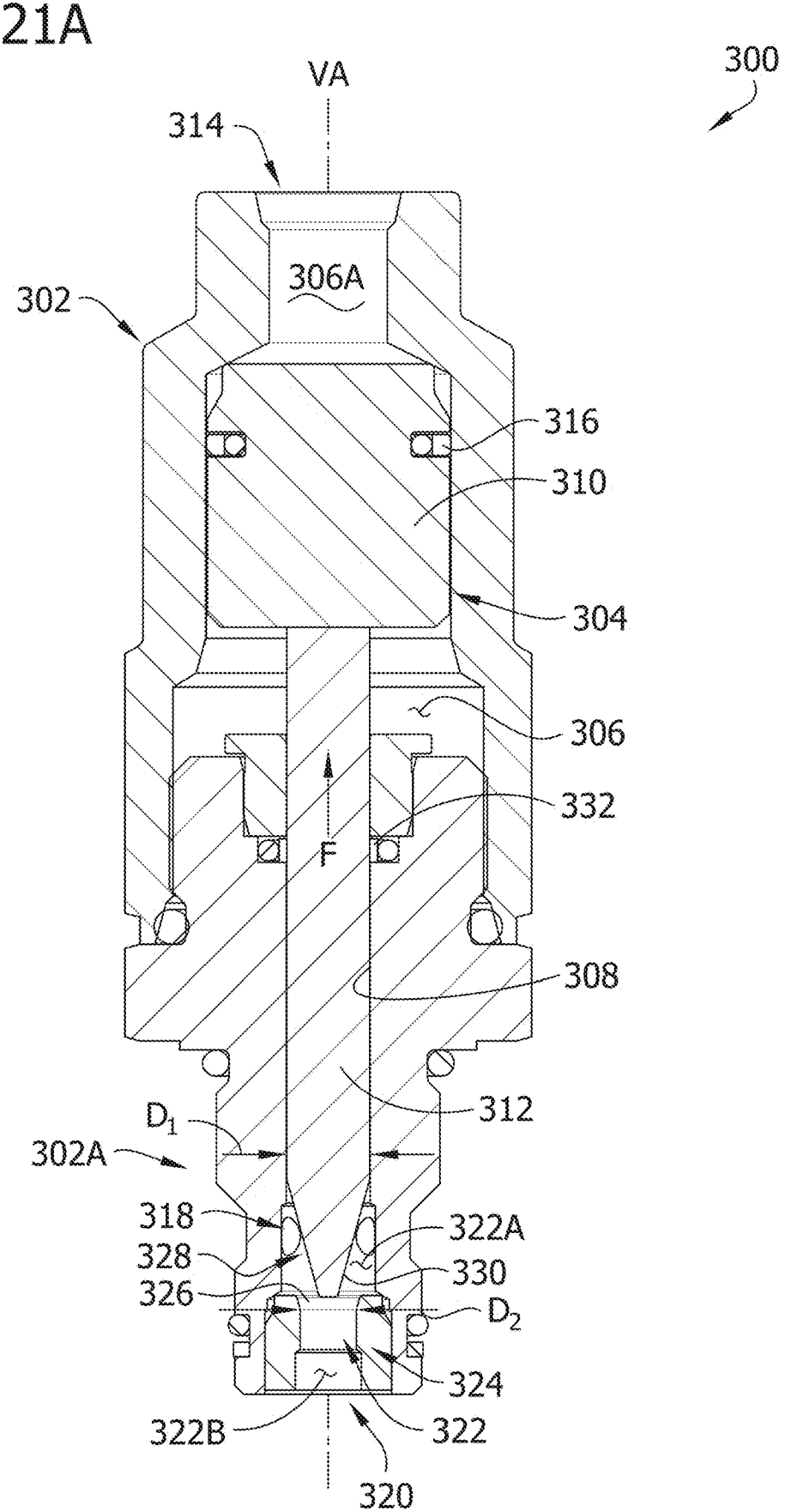
FIG. 21A is a cross-section of the hydraulically operated vent valve, with the hydraulically operated vent valve in an open or venting configuration.
Figure 21B:
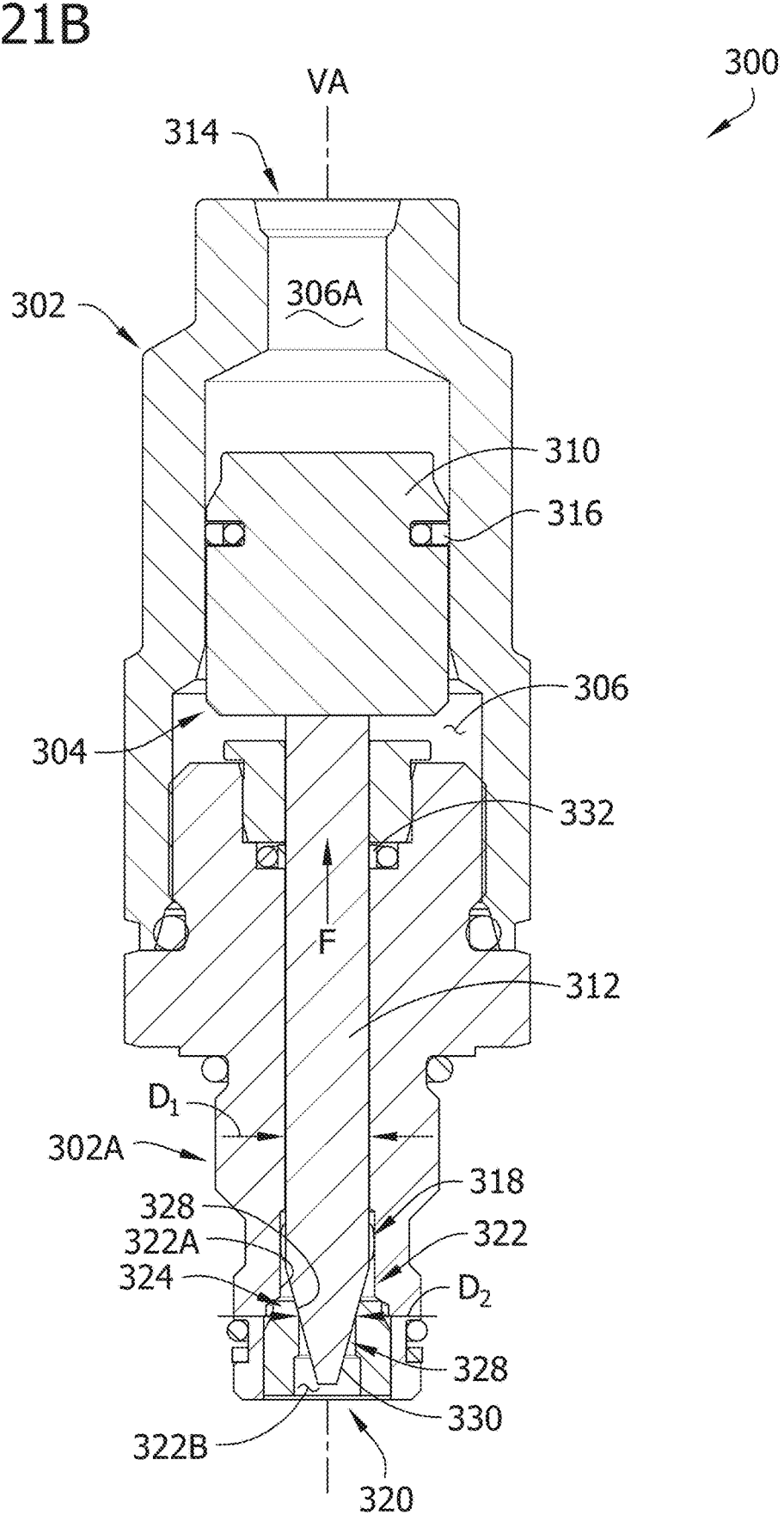
FIG. 21B is a cross-section of the hydraulically operated vent valve, with the hydraulically operated vent valve in a closed or non-venting configuration.

The vent valve 300 includes a valve seat 324. The valve seat 324 is supported by the housing 302. In particular, the valve seat 324 is attached to the insertion portion 302A of the housing 302. The valve seat 324 is disposed in the valve passaging 322 between the first and second openings 318, 320. The blocker 304 is movable relative to the valve seat 324 between an open position (FIG. 21A) and a closed position (FIG. 21B). In the open position, the blocker 304 permits the flow of lubricant between the first and second openings 318, 320. The blocker 304 is spaced apart from the valve seat 324 thereby allowing the lubricant to flow therebetween. In the closed position, the blocker 304 engages the valve seat 324 to block flow of lubricant between the first and second openings 318, 320. The blocker 304, specifically the slide rod 312, has a conical portion 328 arranged to engage the valve seal 324. The conical portion 328 has a blocker sealing surface 330. The valve seat 324 includes a corresponding seat sealing surface 326. The blocker sealing surface 330 engages the seat sealing surface 326 to close the vent valve 300. The blocker sealing surface 330 and the seat sealing surface 326 each have a frustoconical shape or is tapered relative to the valve axis VA. Other configurations of the sealing surfaces are within the scope of the present disclosure. The seat sealing surface 326 separates a first passageway section 322A from a second passageway section 322B.

The blocker 304 is configured to be moved from the closed position toward the open position by the lubricant pressure in the valve passaging 322 when the flow of lubricant is from the first opening toward the second opening (in the first flow direction) and when the flow of lubricant is from the second opening toward the first opening (in the second flow direction). This ability enables the vent valve 300 to be bi-directional. To permit the blocker 304 to move from the closed position toward the open position, the pressure section 306A of the pressure chamber 306 is depressurized (to at or near 0 psi). Therefore, to move the blocker 304 toward the open position, the net force F acting on the blocker (along the valve axis VA and acting in the direction the blocker moves from the closed position to the open position) from the pressurized lubricant in the valve passaging 322 must be large enough to overcome any friction experienced by the blocker (such as due to the gaskets 316, 332), any residual pressure in the pressure section 306A, and the weight of the blocker. The lubricant pressure in the valve passaging 322 that will be present to open the vent valve 300 will generally be the same as the pressure needed to operate the one or more injectors (about 2500-3500 psi).

When the vent valve 300 is venting in the first flow direction (as would be the case when installed in the lubricant distribution system 10 of the present disclosure), the net force F acting on the blocker 304 is a function of the difference in the cross-sectional area of the seal formed between the slide rod 312 and the second gasket 332 and the cross-sectional area of the seal formed between the slide rod and the valve seat 324. This difference is multiplied by the lubricant pressure in the first passageway section 322A to get the resulting net force F. Thus, the difference in cross-sectional areas between these two seals needs to be large enough to result in a net force F sufficient to move the blocker 304 toward the open position. The difference in cross-sectional areas is directly related to a diameter $D_1$ of the slide rod 312 and a diameter $D_2$ of the valve seat (specifically, the smallest diameter of the seat sealing surface 326). The larger the diameter $D_1$ of the slide rod 312 is relative to the diameter $D_2$ of the valve seat 324, the greater the difference will be in the cross-sectional areas and the greater the net force F will be acting to move the blocker 304 toward the open position. Desirably, the diameter $D_1$ of the slide rod 312 is at least 25% larger than the diameter $D_2$ of the valve seat 324, or more desirably at least 40% larger, or even more desirably at least 50% larger. In one embodiment, the diameter $D_1$ of the slide rod 312 is about 0.27555 inch and the diameter $D_2$ of the valve seat 324 is about 0.1875 inch, which equates to a difference in cross-sectional areas of about 0.032 in$^2$, resulting in a net force F of about 112 pounds (when the lubricant pressure is 3,500 psi in the first passageway section 322A) acting on the blocker 324 to move the blocker toward the open position, although other configurations can be used without departing from the scope of the present disclosure. In this embodiment, the diameter $D_1$ of the slide rod 312 is about 47% larger than the diameter $D_2$ of the valve seat 324. Another way of expressing the desired relative sizes of the slide rod 312 and the valve seat 324 can be the relative sizes of the cross-sectional areas. For example, in one embodiment, the difference in the cross-sectional areas of the seals is about equal to or greater than the cross-sectional area of the seal formed between the slide rod 312 and the valve seat 324. This results in the net force F when the vent valve 300 is venting in the first flow direction correspondingly being about equal to or greater than the net force when the vent valve is venting in the second flow direction (described below) (and when the lubricant pressure is the same). In addition, to ensure the pressure in the pressure section 306A can keep the blocker 324 in the closed position, even when the first passageway section 322A is pressurized with lubricant, desirably the cross-sectional area of the head 310 (specifically, the cross-sectional area of the seal formed between the head and the first gasket 316) is at least 10 times greater than the difference in the cross-sectional areas, or more desirably at least 15 times greater. This allows the pressure in the pressure section 306A to be much lower than the pressure in the first passageway section 332A while still be able to holding the blocker 324 in the closed position.

When the vent valve 300 is venting in the second flow direction, the net force F acting on the blocker 304 is a function of the cross-sectional area of the seal formed between the slide rod 312 and the valve seat 324. This difference is multiplied by the lubricant pressure in the second passageway section 322B to get the resulting net force F. Thus, the cross-sectional area of this seal needs to be large enough to result in a net force F sufficient to move the blocker 304 toward the open position. The cross-sectional area is directly related to the diameter $D_2$ of the valve seat 324 (specifically, the smallest diameter of the seat sealing surface 326). In the embodiment described above with the diameter $D_2$ of the valve seat 324 being about 0.1875 inch (a cross-sectional area of about 0.02761 in$^2$), the resulting net force F of about 97 pounds (when the lubricant pressure is 3,500 psi in the second passageway section 322B) that acts on the blocker 324 to move the blocker toward the open position.

Because the blocker 304 is moved by lubricant pressure in the valve passaging (regardless of if the flow of lubricant is in the first flow direction or the second flow direction) toward the open position, the vent valve 300 does not need an opening mechanism, such as spring, solenoid coil, etc., to move the blocker toward the open position. However, an opening mechanism can be used without departing from the scope of the present disclosure.

In one embodiment, a valve kit for the lubricant distribution system 10 is provided. The valve kit may include the mount 202, the electrically operated vent valve 206, and the hydraulically operated vent valve 300. The electrically operated vent valve 206 and the hydraulically operated vent valve 300 are interchangeably coupleable to the vent valve port 220 of the mount 202. The electrically operated vent valve 206 and the hydraulically operative vent valve 300 are each configured to permit lubricant to vent from the mount outlet 214 toward the mount return outlet 232 when coupled to the vent valve port 220. To facilitate the interchangeability of the electrically operated vent valve 206 and the hydraulically operated vent valve 300 with the vent valve port 220, each of the respective connectors 207, 307 includes the same threaded (e.g., same size of threads) for threading to the vent valve port. Further, because the positioning of the first opening 318 and the second opening 320 of the hydraulically operated vent valve 300 relative to the vent valve port 220 is substantially similar (if not identical) to the positioning of the inlet 209 and the outlet 211, respectively, of the electrically operated vent valve 206 relative to the vent valve port, both vent valves are plug-and-play operable with the mount 202 without requiring any modification or configuration of the mount when selecting the type of vent valve to use. In one configuration, the lubricant distribution system 10 includes the electrically operated vent valve 206 coupled to the mount 202 and the electric motor 26 connected to the motor connector 103. In another configuration, the lubricant distribution system 10 includes the hydraulically operated vent valve 300 coupled to the mount 202 and the hydraulic motor 26' connected to the motor connector 103. In another configuration, the lubricant distribution system 10 includes the electrically operated vent valve 206 coupled to the mount 202 and the hydraulic motor 26' connected to the motor connector 103.

Having described the disclosure in detail, it will be apparent that modifications and variations are possible without departing from the scope of the disclosure defined in the appended claims.

When introducing elements of the present disclosure or the preferred embodiments(s) thereof, the articles "a", "an", "the", and "said" are intended to mean that there are one or more of the elements. The terms "comprising", "including", and "having" are intended to be inclusive and mean that there may be additional elements other than the listed elements.

In view of the above, it will be seen that the several objects of the disclosure are achieved and other advantageous results attained.

As various changes could be made in the above constructions without departing from the scope of the disclosure, it is intended that all matter contained in the above description and shown in the accompanying drawings shall be interpreted as illustrative and not in a limiting sense.

What is claimed is:

1. A lubricant distribution system comprising:
a reservoir configured to contain lubricant, the reservoir including a follower configured to move up and down in the reservoir in response to a changing level of lubricant in the reservoir;
an inlet arranged to deliver lubricant to the reservoir; and
a shut-off valve in fluid communication with the inlet, the shut-off valve including a blocker selectively positionable for permitting flow of lubricant through the inlet and for preventing flow of lubricant through the inlet, the shut-off valve including a valve actuator having a follower engagement surface arranged to be engaged by the follower when lubricant in the reservoir fills to a predetermined level to position the blocker to prevent flow of lubricant through the inlet, the follower engagement surface and the blocker being configured to move together to position the blocker to prevent flow of lubricant through the inlet, and the follower engagement surface being configured to move relative to the blocker after positioning the blocker to prevent flow of lubricant through the inlet.

2. The lubricant distribution system of claim 1, wherein the blocker is configured to move along a blocker axis for selectively permitting and preventing flow of lubricant through the inlet, wherein the follower engagement surface is movable relative to the blocker along the blocker axis.

3. The lubricant distribution system of claim 1, further comprising a first spring biasing the follower engagement surface and the blocker away from one another.

4. The lubricant distribution system of claim 3, further comprising a second spring biasing the blocker toward a position that permits flow of lubricant through the inlet.

5. The lubricant distribution system of claim 4, wherein a spring constant of the first spring is greater than a spring constant of the second spring.

6. The lubricant distribution system of claim 1, wherein the valve actuator comprises a slider, the slider arranged to slide along an axis to engage the blocker to position the blocker to prevent flow of lubricant through the inlet.

7. The lubricant distribution system of claim 6, wherein the slider comprises a first valve stem and a second valve stem movable along the axis relative to the first valve stem, the second valve stem including the follower engagement surface.

8. The lubricant distribution system of claim 7, wherein the slider comprises a spring disposed between the first and second valve stems.

9. The lubricant distribution system of claim 1, wherein the blocker comprises a spool.

10. The lubricant distribution system of claim 1, further comprising a pump configured to pump lubricant from the reservoir.

11. The lubricant distribution system of claim 1, wherein the blocker is selectively positionable in a closed position for preventing flow of lubricant through the inlet, and wherein the valve actuator is configured to permit the follower engagement surface to be movable relative to the blocker when the blocker is in the closed position.

12. The lubricant distribution system of claim 1, wherein the follower of the reservoir is movable relative to the follower engagement surface of the valve actuator.

13. A shut-off valve for lubricant, the shut-off valve comprising:
a valve housing having an inlet, an outlet, and passaging fluidly connecting the inlet and the outlet;

a blocker carried by the valve housing, the blocker being selectively positionable relative to the valve housing for permitting flow of lubricant through the passaging from the inlet to the outlet and for preventing flow of lubricant through the passaging from the inlet to the outlet, the blocker being selectively positionable in a closed position for preventing flow of lubricant through the passaging; and a valve actuator carried by the valve housing, the valve actuator being operatively connected to the blocker for selectively positioning the blocker relative to the valve housing, the valve actuator having an actuation surface configured to be moved to move the blocker into the closed position in which the blocker prevents flow of lubricant through the passaging, the valve actuator configured to permit the actuation surface to be movable relative to the blocker when the blocker is in the closed position.

14. The shut-off valve of claim 13, wherein the blocker is configured to move along a blocker axis for selectively permitting and preventing flow of lubricant through the passaging, wherein the actuation surface is movable relative to the blocker along the blocker axis.

15. The shut-off valve of claim 14, wherein the valve actuator is configured to move along the blocker axis to selectively position the blocker relative to the valve housing.

16. The shut-off valve of claim 15, wherein the valve actuator comprises a first rod and a second rod, the first and second rods being supported by and slidable relative to the valve housing along the blocker axis, the first and second rods being slidable relative to one another along the blocker axis, the second rod including the actuation surface.

17. The shut-off valve of claim 16, wherein the valve actuator comprises a spring arranged to permit the first and second rods to slide relative to one another, the spring being supported by and slidable relative to the valve housing along the blocker axis.

18. The shut-off valve of claim 14, wherein the valve actuator comprises a spring arranged to permit the actuation surface to move relative to the blocker along the blocker axis.

19. The shut-off valve of claim 18, wherein the spring is uncompressed when the blocker is in an open position in which the blocker permits flow of lubricant through the passaging.

20. The shut-off valve of claim 19, wherein the closed position is a second closed position, the blocker being movable to a first closed position in which the blocker prevents flow of lubricant through the passaging, the spring being uncompressed when the blocker is in the first closed position, the first closed position being different than the second closed position.

21. The shut-off valve of claim 20, wherein the blocker is configured to move in a first direction from the open position, through the first closed position, and to the second closed position, the blocker being inhibited from further movement in the first direction when in the second closed position such that movement of the actuation surface in the first direction compresses the spring.

22. The shut-off valve of claim 13, wherein the blocker comprises a spool.

23. A lubricant distribution system comprising:
a reservoir configured to contain lubricant, the reservoir including a follower configured to move up and down in the reservoir in response to a changing level of lubricant in the reservoir;

an inlet arranged to deliver lubricant to the reservoir; and a shut-off valve in fluid communication with the inlet, the shut-off valve including a blocker selectively positionable for permitting flow of lubricant through the inlet and for preventing flow of lubricant through the inlet, the shut-off valve including a valve actuator having a follower engagement surface arranged to be engaged by the follower when lubricant in the reservoir fills to a predetermined level to position the blocker to prevent flow of lubricant through the inlet, the follower engagement surface being movable relative to the blocker, the blocker being configured to move along a blocker axis for selectively permitting and preventing flow of lubricant through the inlet, the follower engagement surface being movable relative to the blocker along the blocker axis.

24. The lubricant distribution system of claim 23, wherein the valve actuator comprises a first spring biasing the follower engagement surface and the blocker away from one another.

25. The lubricant distribution system of claim 24, further comprising a second spring biasing the blocker toward a position that permits flow of lubricant through the inlet.

26. The lubricant distribution system of claim 25, wherein a spring constant of the first spring is greater than a spring constant of the second spring.

27. The lubricant distribution system of claim 26, wherein the valve actuator comprises a first valve stem and a second valve stem, the first and second valve stems arranged to slide along the blocker axis, the first spring being positioned between the first and second valve stems, the second valve stem including the follower engagement surface.

28. The lubricant distribution system of claim 27, wherein the first valve stem is arranged to engage the blocker to position the blocker to prevent flow of lubricant through the inlet.

29. The lubricant distribution system of claim 28, wherein the blocker comprises a spool.

30. The lubricant distribution system of claim 29, wherein the follower of the reservoir is movable relative to the follower engagement surface of the valve actuator.

31. A lubricant distribution system comprising:
a reservoir configured to contain lubricant, the reservoir including a follower configured to move up and down in the reservoir in response to a changing level of lubricant in the reservoir;

an inlet arranged to deliver lubricant to the reservoir; and a shut-off valve in fluid communication with the inlet, the shut-off valve including a blocker selectively positionable for permitting flow of lubricant through the inlet and for preventing flow of lubricant through the inlet, the shut-off valve including a valve actuator having a follower engagement surface arranged to be engaged by the follower when lubricant in the reservoir fills to a predetermined level to position the blocker to prevent flow of lubricant through the inlet, the follower engagement surface being movable relative to the blocker, the blocker being selectively positionable in a closed position for preventing flow of lubricant through the inlet, the valve actuator being configured to permit the follower engagement surface to be movable relative to the blocker when the blocker is in the closed position.

32. The lubricant distribution system of claim 31, wherein the valve actuator comprises a first spring configured to be compressed when the follower engagement surface is moved relative to the blocker when the blocker is in the closed position.

33. The lubricant distribution system of claim 32, wherein the first spring is operatively disposed between the follower engagement surface and the blocker.

34. The lubricant distribution system of claim 32, further comprising a second spring biasing the blocker toward a position that permits flow of lubricant through the inlet.

35. The lubricant distribution system of claim 34, wherein a spring constant of the first spring is greater than a spring constant of the second spring.

36. The lubricant distribution system of claim 31, wherein the valve actuator comprises a spring arranged to slide along an axis toward the blocker when the follower engagement surface is engaged by the follower to position the blocker to prevent flow of lubricant through the inlet.

37. The lubricant distribution system of claim 36, wherein the spring is configured to be compressed when the follower engagement surface is moved relative to the blocker when the blocker is in the closed position.

38. The lubricant distribution system of claim 31, wherein the blocker comprises a spool.

39. The lubricant distribution system of claim 31, wherein the follower of the reservoir is movable relative to the follower engagement surface of the valve actuator.

* * * * *